(12) United States Patent
Yamasaki

(10) Patent No.: US 7,593,757 B2
(45) Date of Patent: Sep. 22, 2009

(54) MOBILE INFORMATION APPARATUS

(75) Inventor: Masafumi Yamasaki, Hachioji (JP)

(73) Assignees: Olympus Corporation (JP); Olympus Imaging Corp (JP)

( * ) Notice: Subject to any disclaimer, the term of this patent is extended or adjusted under 35 U.S.C. 154(b) by 625 days.

(21) Appl. No.: 11/180,846

(22) Filed: Jul. 13, 2005

(65) Prior Publication Data
US 2006/0019614 A1 Jan. 26, 2006

(30) Foreign Application Priority Data

Jul. 20, 2004 (JP) ............... 2004-212087
Mar. 31, 2005 (JP) ............... 2005-104126

(51) Int. Cl.
H04M 1/00 (2006.01)
H04B 1/38 (2006.01)

(52) U.S. Cl. .............. 455/575.3; 455/575.1; 455/550.1; 455/90.1; 455/90.3

(58) Field of Classification Search ... 455/575.1–575.3, 455/575.6, 575.8, 90.1–90.3, 550.1, 566, 455/41.2, 41.3, 74; 379/433.11, 433.13
See application file for complete search history.

(56) References Cited

U.S. PATENT DOCUMENTS

| 7,181,253 B2 * | 2/2007 | Kim ..................... 455/575.1 |
| 7,292,880 B2 * | 11/2007 | Lehtonen ............... 455/569.1 |
| 2003/0096582 A1 | 5/2003 | Kim | |

FOREIGN PATENT DOCUMENTS

| CN | 1420674 A | 5/2003 |
| JP | 06-164440 | 6/1994 |
| JP | 08-298538 | 11/1996 |
| JP | 10-020997 | 1/1998 |
| JP | 11-119859 | 4/1999 |
| JP | 2002-16685 | 1/2002 |
| JP | 2003-248194 | 9/2003 |

OTHER PUBLICATIONS

Untranslated Chinese Action issued on Apr. 27, 2007 in connection with corresponding Chinese application No. 2005100875042.
Office Action mailed by Japanese Patent Office on Jul. 7, 2009 in connection with corresponding Japanese Patent Application No. 2005-104126.

* cited by examiner

Primary Examiner—Eugene Yun
(74) Attorney, Agent, or Firm—Ostrolenk Faber LLP

(57) ABSTRACT

A mobile information apparatus having first and second operation modes includes upper, middle, and lower bodies of equipment arranged in layers, a hinge for pivotally connecting the upper body of equipment to the middle body of equipment so that the upper and middle bodies of equipment have folded and unfolded positions, a hinge for pivotally connecting the middle body of equipment to the lower body of equipment so that the middle and lower bodies of equipment have folded and unfolded positions, a first operation switch mounted on at least one of the upper body of equipment and the middle body of equipment and allowing the mobile information apparatus to operate in the first operation mode when the upper and middle bodies of equipment are in the unfolded positions, and a second operation switch mounted on at least one of the middle body of equipment and the lower body of equipment and allowing the mobile information apparatus to operate in the second operation mode when the middle and lower bodies of equipment are in the unfolded positions.

2 Claims, 19 Drawing Sheets

FIG. 16A　　FIG. 16B
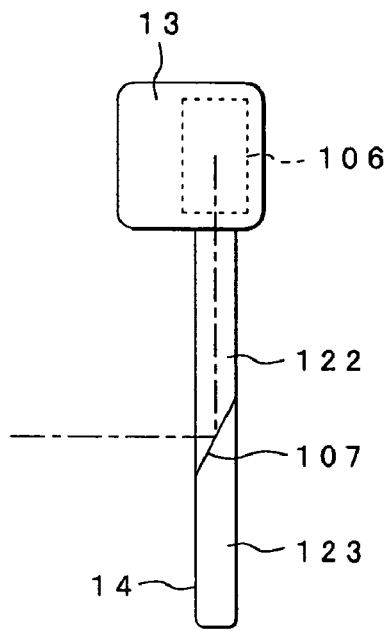 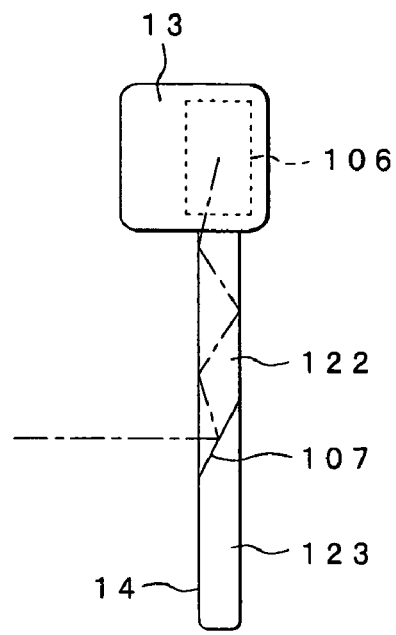
FIG. 17
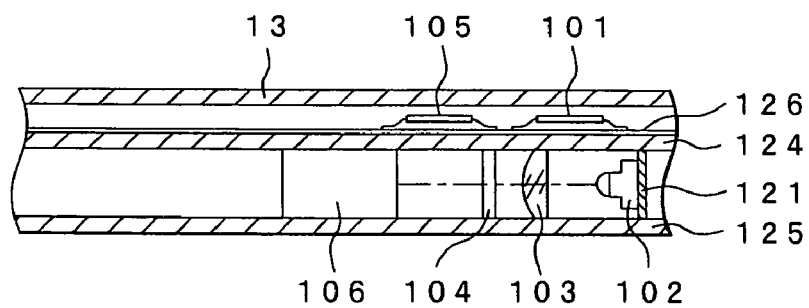

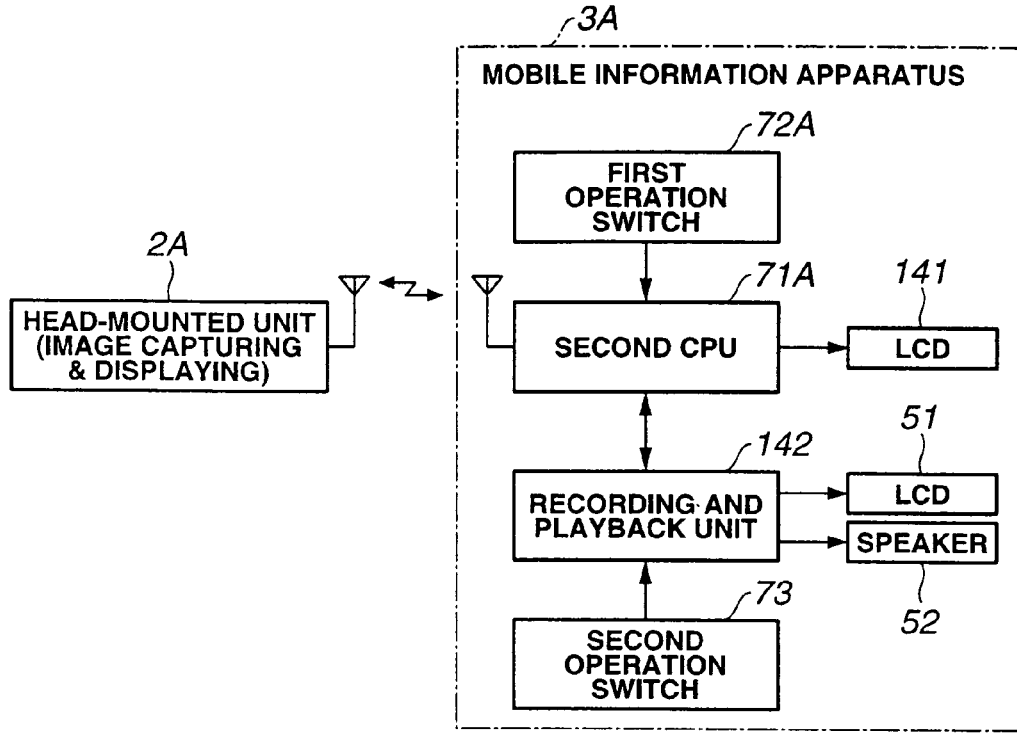
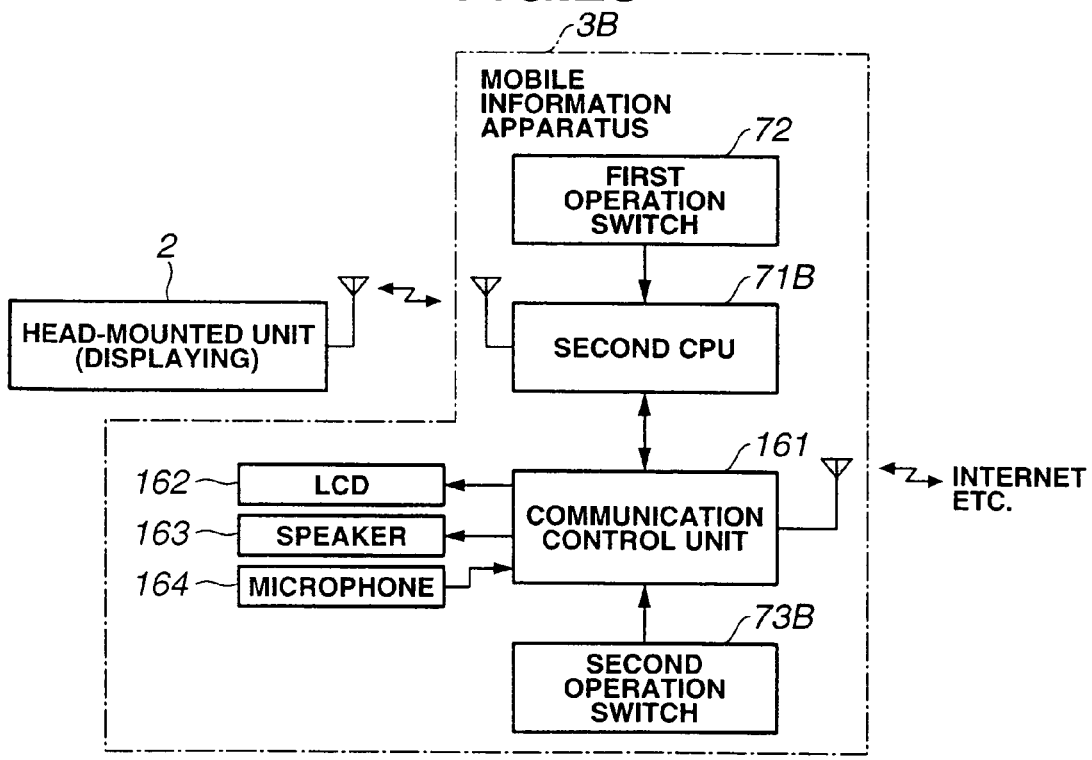

MOBILE INFORMATION APPARATUS

This application claims benefit of Japanese Application No. 2004-212087 filed in Japan on Jul. 20, 2004, Japanese Application No. 2005-104126 filed in Japan on Mar. 31, 2005, the contents of which are incorporated by this reference.

BACKGROUND OF THE INVENTION

1. Field of the Invention

The present invention relates to a mobile information apparatus capable of operating in a plurality of operation modes.

2. Description of the Related Art

In recent years, a variety of mobile information apparatuses have been widely used. Examples of such mobile information apparatuses include handheld computers, electronic dictionaries, and head-mounted displays. In particular, cell phones are an example of the mobile information apparatuses which many people carry around with them for a long time.

Cell phones are provided in various forms. For example, a widely known cell phone has a first body of equipment and a second body of equipment connected to the first body of equipment with a hinge in a flip-open and flip-close manner. A cell phone having such a structure is disclosed in, for example, Japanese Unexamined Patent Application Publication No. 8-298538.

Some models of such cell phones have not only a telephone function but also a function for transmitting and receiving a variety of information via the Internet and a function for capturing still and moving images with a built-in camera and externally transmitting the images. In recent years, cell phones have become much more multifunctional.

On the other hand, display apparatuses which are mounted on the human head to view an image have been known. Examples of the display apparatuses include a head-mounted display (HMD) and a head-up display (HUD).

Such a display apparatus is disclosed in, for example, Japanese Unexamined Patent Application Publication No. 2003-248194. In a video display apparatus disclosed in this publication, a light-emitting diode and a liquid crystal display element are arranged at positions corresponding to the frames of glasses in order to produce an image. The produced image is projected onto holographic optical elements arranged at positions corresponding to lenses of the glasses as a combiner. An image reflected by the holographic optical elements is led to observer's eyes. Thus, the image (i.e., a virtual image) is superimposed over an external world image and can be viewed by the observer.

However, since a cell phone is designed to be small and lightweight, the number of buttons operably arranged on a surface of the cell phone is limited. Accordingly, many functions are assigned to one button. If cell phones become more multifunctional, the operation of cell phones will become more complicated, and therefore, the operability of cell phones will significantly decrease.

SUMMARY OF THE INVENTION

Accordingly, it is an object of the present invention to provide a compact and easy-to-operate mobile information apparatus even when the mobile information apparatus becomes more multifunctional.

To achieve the above-described object, the present invention provides a mobile information apparatus operated in a first operation mode and a second operation mode different from the first operation mode. The mobile information apparatus includes a first body of equipment, a second body of equipment, and a third body of equipment arranged in stacked layers; a first hinge unit for connecting the first body of equipment to the second body of equipment in a pivotal manner so that the first body of equipment and the second body of equipment are capable of being placed in folded and unfolded positions; a second hinge unit for connecting the second body of equipment to the third body of equipment in a pivotal manner so that the second body of equipment and the third body of equipment are capable of being placed in folded and unfolded positions; a first operation member mounted on at least one of the first body of equipment and the second body of equipment, wherein the first operation member allows the mobile information apparatus to be operated in the first operation mode when the first body of equipment and the second body of equipment are in the unfolded positions; and a second operation member mounted on at least one of the second body of equipment and the third body of equipment, wherein the second operation member allows the mobile information apparatus to be operated in the second operation mode when the second body of equipment and the third body of equipment are in the unfolded positions.

The above and other objects, features, and advantages of the invention will become more clearly understood from the following description referring to the accompanying drawings.

BRIEF DESCRIPTION OF THE DRAWINGS

FIGS. 16A and 16B are left side views illustrating examples of the configuration of the optical system of the see-through information display portion according to the first embodiment;

FIG. 17 is a sectional plan view illustrating the configuration of the optical system of the see-through information display portion according to the first embodiment;

FIG. 26 is a block diagram illustrating the configuration of a mobile information apparatus capable of communicating with a head-mounted unit according to a second embodiment of the present invention;

FIG. 28 is a block diagram illustrating the configuration of a mobile information apparatus capable of communicating with a head-mounted unit according to a third embodiment of the present invention.

DETAILED DESCRIPTION OF THE PREFERRED EMBODIMENTS

The embodiments of the present invention are described in detail below with reference to the accompanying drawings.

First Embodiment

Figure 1:
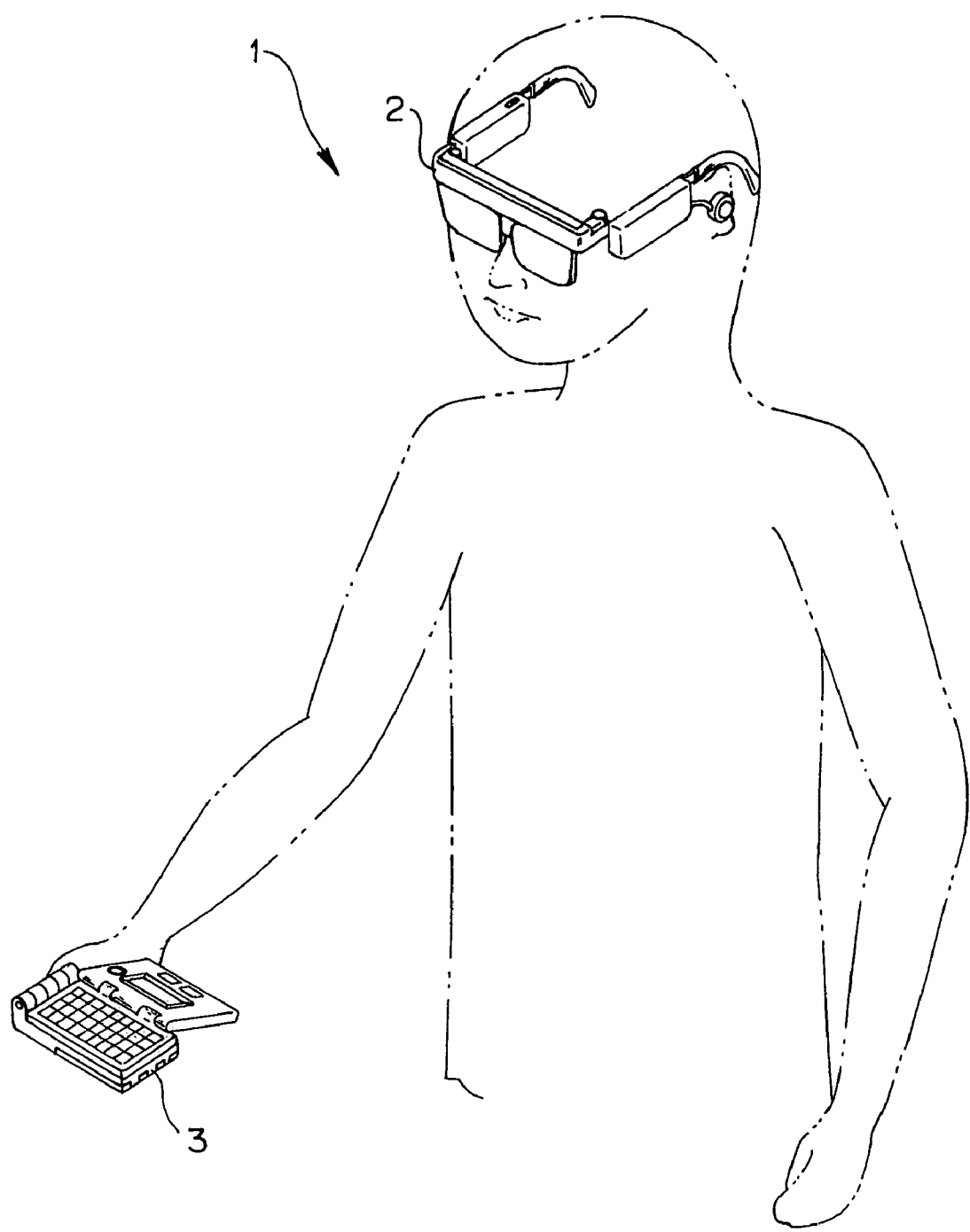
FIG. 1 is a perspective view illustrating a state in which a mobile information system in accordance with a first embodiment of the present invention is used.

FIGS. 1 to 25 illustrate a first embodiment of the present invention. FIG. 1 is a perspective view in using a mobile information system.

As shown in FIG. 1, the mobile information system 1 mainly includes a head-mounted unit 2 formed substantially in the shape of glasses and a mobile information apparatus 3 separately formed from the head-mounted unit 2. The mobile information apparatus 3 transmits and receives information to and from the head-mounted unit 2 by means of, for example, wireless communication.

The head-mounted unit 2 allows a user to view an observation object (external world) substantially directly in a see-through display mode and also to view information superimposed on the observation object. As can be seen from the shape of the head-mounted unit 2, namely, the shape of glasses, the head-mounted unit 2 can be worn on the head in a manner similar to ordinary eyesight-correcting glasses. The head-mounted unit 2 is designed to be small and lightweight so that the size and the weight thereof can be as close as possible to those of actual glasses. As a result, the head-mounted unit 2 is comfortable to wear.

The mobile information apparatus 3 wirelessly transmits display information and a control signal for a remote operation to the head-mounted unit 2. Additionally, the mobile information apparatus 3 carries out overall control of the mobile information system 1. Like the head-mounted unit 2, the mobile information apparatus 3 is designed to be small and lightweight as much as possible. From the viewpoint of the mobile information apparatus 3, the head-mounted unit 2 is an externally disposed display unit.

Accordingly, a user can freely move around with the head-mounted unit 2 on his or her head without being annoyed by a connection cord. In addition, since the mobile information apparatus 3 has no extended connection cord, the mobile information apparatus 3 is conveniently portable and is easy to operate.

Figure 2:
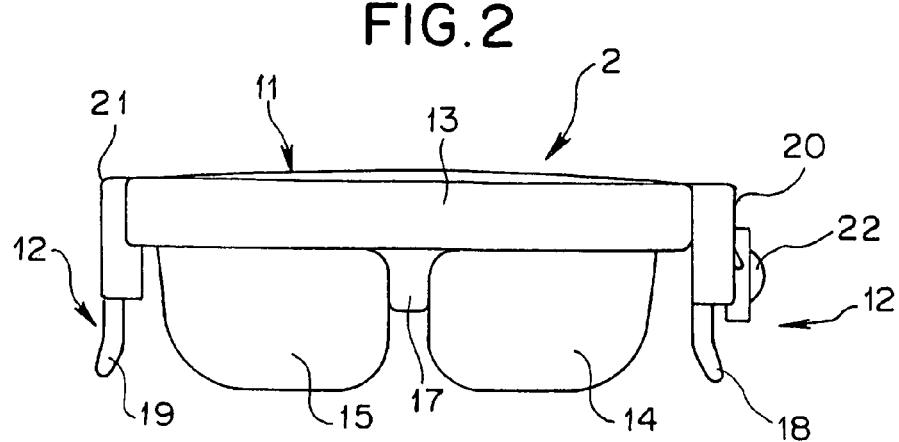
FIG. 2 is a front view illustrating a head-mounted unit according to the first embodiment.
Figure 3:
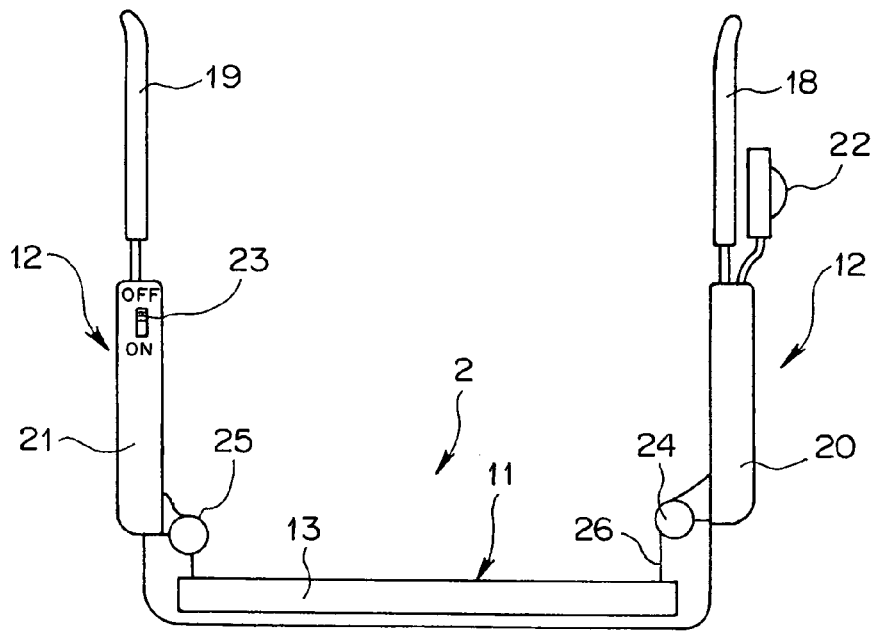
FIG. 3 is a plan view illustrating the head-mounted unit according to the first embodiment.
Figure 4:
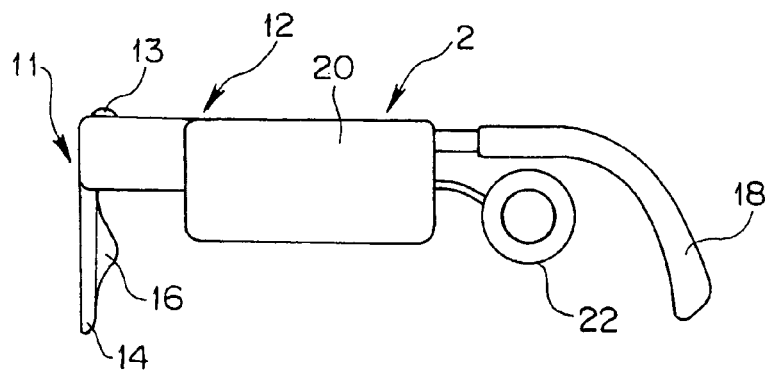
FIG. 4 is a right side view illustrating the head-mounted unit according to the first embodiment.

The external appearance and the overview of the head-mounted unit 2 are described next with reference to FIGS. 2 to 4. FIGS. 2 and 3 are a front view and a plan view of the head-mounted unit 2, respectively. FIG. 4 is a right side view of the head-mounted unit 2.

The head-mounted unit 2 includes a front portion 11 corresponding to lens, rims, a bridge, and joint portions of regular glasses and temples 12 extending from the left and right sides of the front portion 11 in the backward direction (opposite to the observation object). The temples 12 are foldable with respect to the front portion 11.

The front portion 11 includes a frame 13 and transparent optical members 14 and 15 attached to the frame 13 in association with the left and right eyes. The transparent optical members 14 and 15 serve as optical waveguide members.

At the center of the frame 13, a nose pad portion 16 for placing the head-mounted unit 2 on the ridge of the nose and a bridge portion 17 formed at an upper section between the transparent optical members 14 and 15 are provided.

The temples 12 are connected to the front portion 11 via hinges 24 and 25 so as to be foldable with respect to the front portion 11. That is, when the head-mounted unit 2 is unused, the temples 12 can be bent inward towards the center of the front portion 11 so that the temples 12 are folded flat against the front portion 11. Therefore, the size of the head-mounted unit 2 is reduced so that the head-mounted unit 2 can be conveniently stored or carried around. End covers 18 and 19 for placing the head-mounted unit 2 on the ears are provided at the distal ends of the left and right templates 12, respectively.

Additionally, an electronic component 20 is provided on the left-eye side of the temple 12 (i.e., the right side in FIGS. 2 and 3) as an integral part to primarily accommodate an electronic circuit for controlling see-through display. A battery container 21 is provided on the right-eye side of the temple 12 as an integral part to primarily accommodate a power supply circuit 92 of the head-mounted unit 2 (see FIG. 13). The battery container 21 is designed to removably accommodate a battery. For example, a power switch 23 for powering on and off the head-mounted unit 2 is provided on the top surface of the battery container 21. Accordingly, when the temples 12 are folded, the electronic component 20 and the battery container 21 are also folded following the temples 12. Thus, since the electronic component 20 and the battery container 21 are provided on the foldable temples 12, the mobile information system 1 can be stored without the need for a large space.

The front portion 11, the electronic component 20, and the battery container 21 are designed to provide optimum shapes and weight balances so that a user feels comfortable when wearing the head-mounted unit 2.

A speaker 22 is provided while extending from the electronic component 20 so that a user can listen to sound with the left ear. In this embodiment, the speaker 22 is provided only for the left ear to listen to monaural sound. However, speakers may be provided for both ears to listen to stereo sound.

Between the right side of the front portion 11 and the hinge 24, a box 26 is disposed to accommodate a flexible printed board for connecting each circuit inside the front portion 11 to each circuit in the electronic component 20 and the like. Similarly, between the left side of the front portion 11 and the hinge 25, another box is disposed to accommodate power lines and signal lines for connecting each circuit inside the front portion 11 to each circuit inside the battery container 21.

Figure 5:
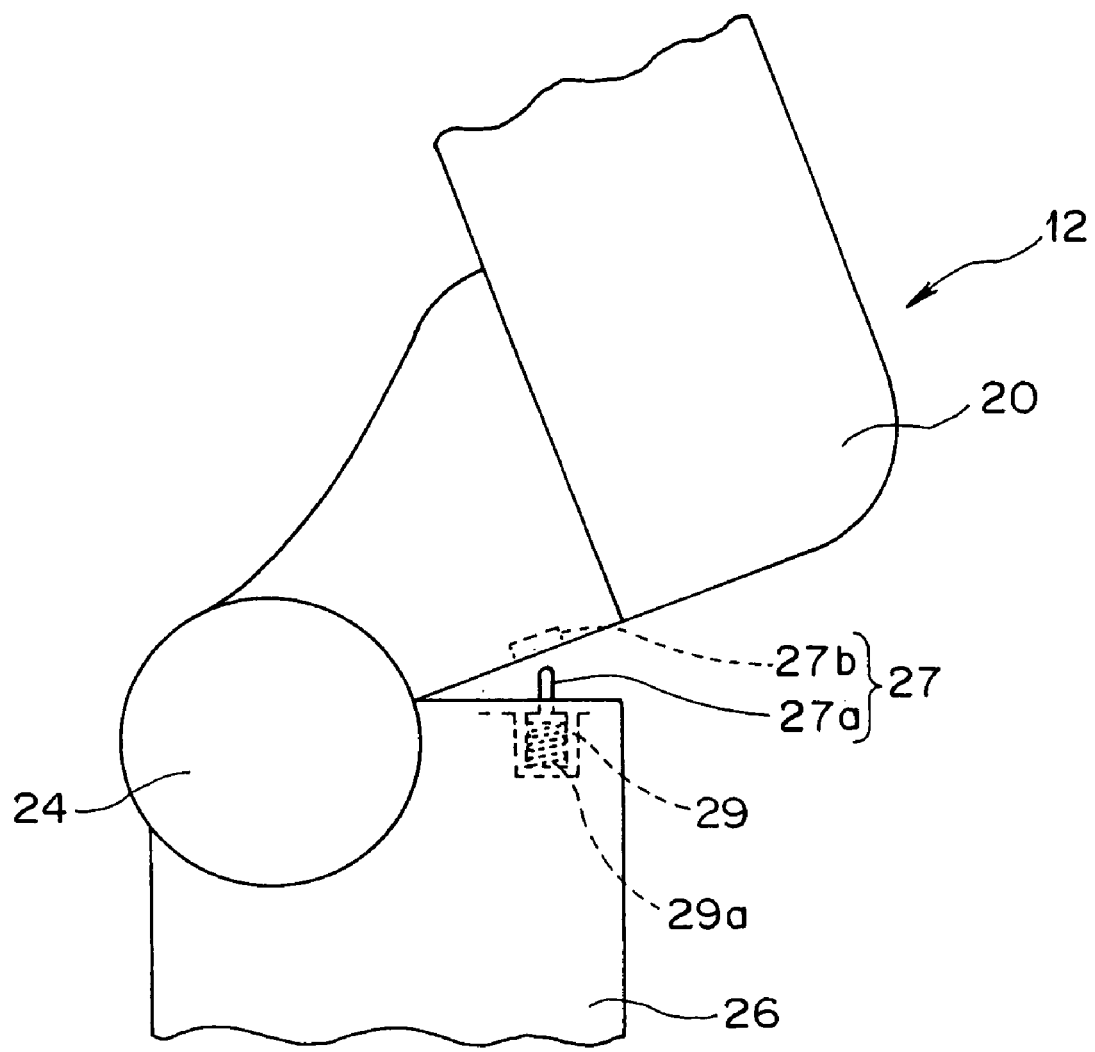
FIG. 5 is a partially enlarged plan view illustrating the structure of a switch for detecting whether a temple disposed in the vicinity of a hinge is folded or unfolded.

FIG. 5 is a partial magnified plan view of a switch provided in the vicinity of the hinge 24 for detecting an open and closed state of the temples 12.

As shown in FIG. 5, the box 26 includes a contact point 27a having a protrusion protruding towards the electronic component 20. At a position on the temple 12 opposite to the contact point 27a, a contact point 27b having, for example, a flat portion is formed. A switch 27 is composed of these contact points 27a and 27b to detect the open and closed state of the temples 12.

The box 26 also includes a recess portion 29 for slidably supporting the contact point 27a in the forward and backward directions. In the recess portion 29, a spring 29a is disposed to urge the contact point 27a towards the electronic component 20.

In such a structure, when the contact point 27a is not in contact with the contact point 27b, the contact point 27a stays at a position where the bottom end of the contact point 27a is in contact with the inner surface of the box 26 and a part of the protrusion extends from the outer surface of the box 26.

As the temple 12 opens on the hinge 24, the contact point 27a is brought into contact with the contact point 27b at a position slightly before a position shown in FIG. 3, that is, at a position where the temple 12 is folded against the front portion 11 at a predetermined angle from the position shown in FIG. 3. Thus, the switch 27 is closed.

This structure allows the head-mounted unit 2 to detect whether the temple 12 is not unfolded to a predetermined position (i.e., in an unavailable state) or whether it is unfolded to the predetermined position (i.e., in a usable state) according to the open/close state of the switch 27.

Figure 13:
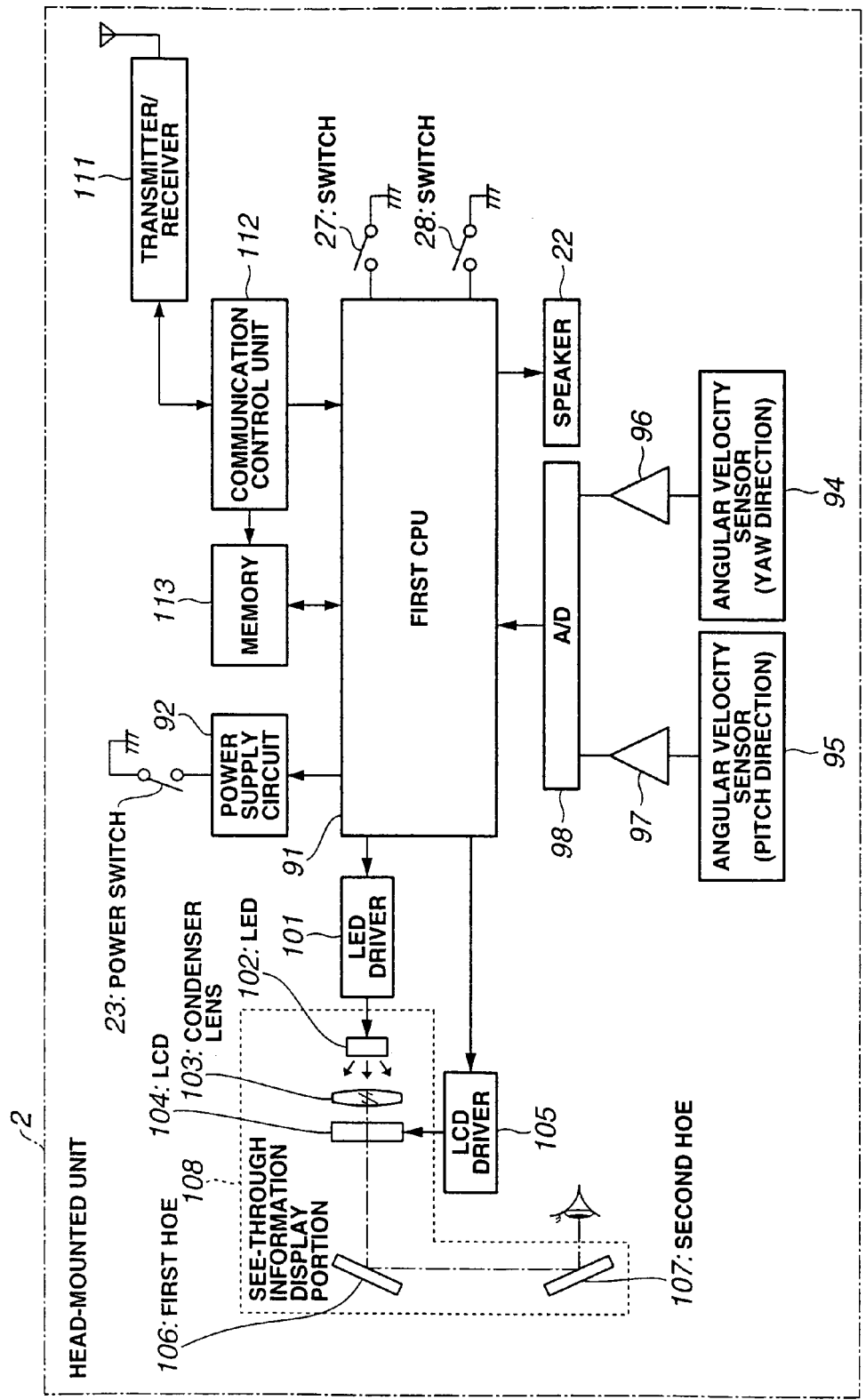
FIG. 13 is a block diagram illustrating the configuration of, mainly, an electronic circuit of the head-mounted unit in the mobile information system according to the first embodiment.

Additionally, a switch 28 having the same structure as the switch 27 is provided at a position on the left of FIG. 3 corresponding to the switch 27, that is, at a position in the vicinity of the hinge 25 (see FIG. 13).

When at least one of the switches 27 and 28 is open, the head-mounted unit 2 is not used, for example, in a stowed condition. If at least one of the switches 27 and 28 is open while the head-mounted unit 2 is mounted on the head, displayed information is not normally projected on the eyes of a user. This condition is not desirable for the user to view the displayed information. Accordingly, if at least one of the switches 27 and 28 is open, it is determined that the head-mounted unit 2 is in an unavailable state so as to turn off electric power supplied to a power supply circuit 92 (see FIG. 13) of the head-mounted unit 2. This control can prevent the electric power from being wasted when the head-mounted unit 2 is in an unavailable state.

In addition, when the mobile information system 1 is used in a playback mode, which is described below with reference to FIG. 11, and the switch 27 and the switch 28 are closed, display on an LCD (liquid crystal display) 104 of the head-mounted unit 2 is carried out. On the other hand, when the mobile information system 1 is used in an initial state switched to a playback mode and when at least one of the switch 27 and the switch 28 is open and the head-mounted unit 2 is in an unavailable state (i.e., at least one of the right and left temples 12 is folded), information display on an LCD 51 of the mobile information apparatus 3 is forcibly carried out.

Figure 6:
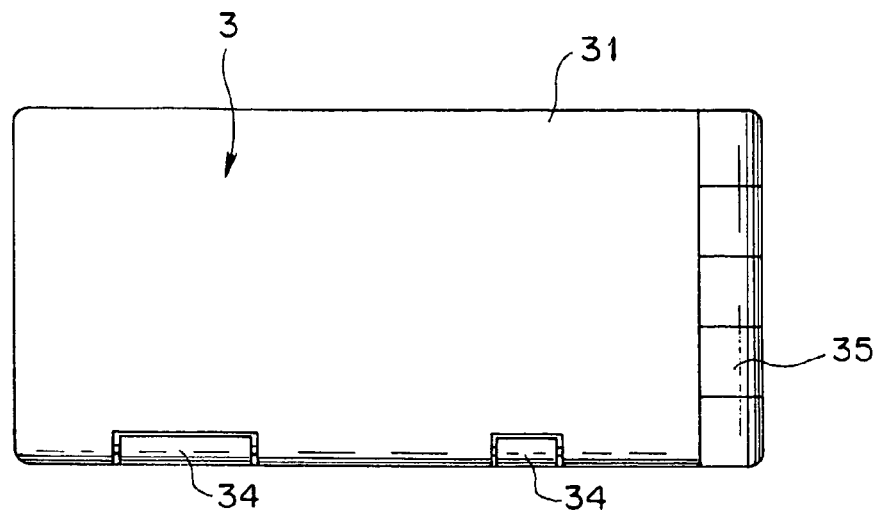
FIG. 6 is a plan view illustrating a mobile information apparatus according to the first embodiment when all of the bodies of equipment are folded.
Figure 7:
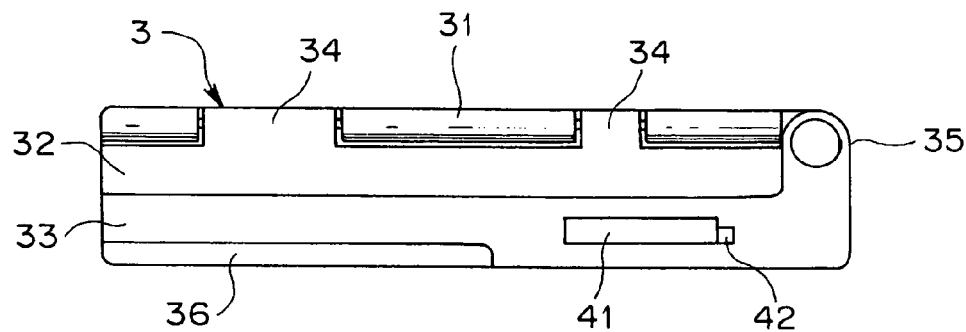
FIG. 7 is a right side view illustrating the mobile information apparatus according to the first embodiment when all of the bodies of equipment are folded.
Figure 8:
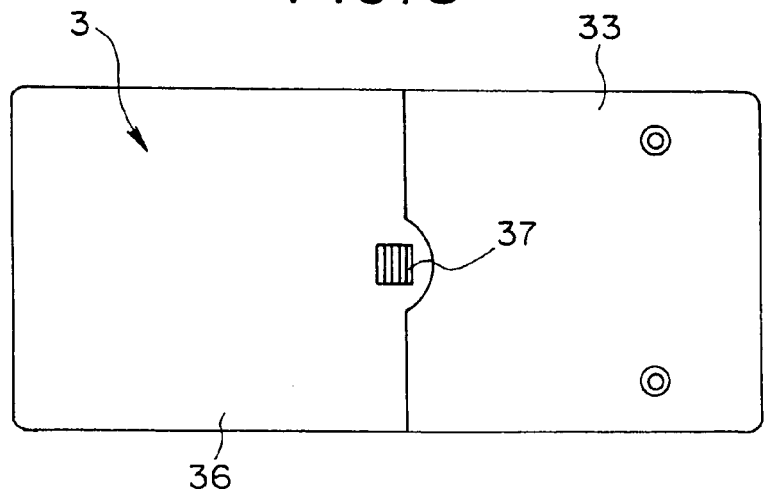
FIG. 8 is a bottom view illustrating the mobile information apparatus according to the first embodiment when all of the bodies of equipment are folded.
Figure 9:
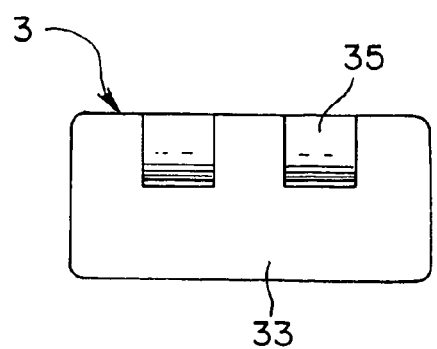
FIG. 9 is a rear view illustrating the mobile information apparatus according to the first embodiment when all of the bodies of equipment are folded.
Figure 10:
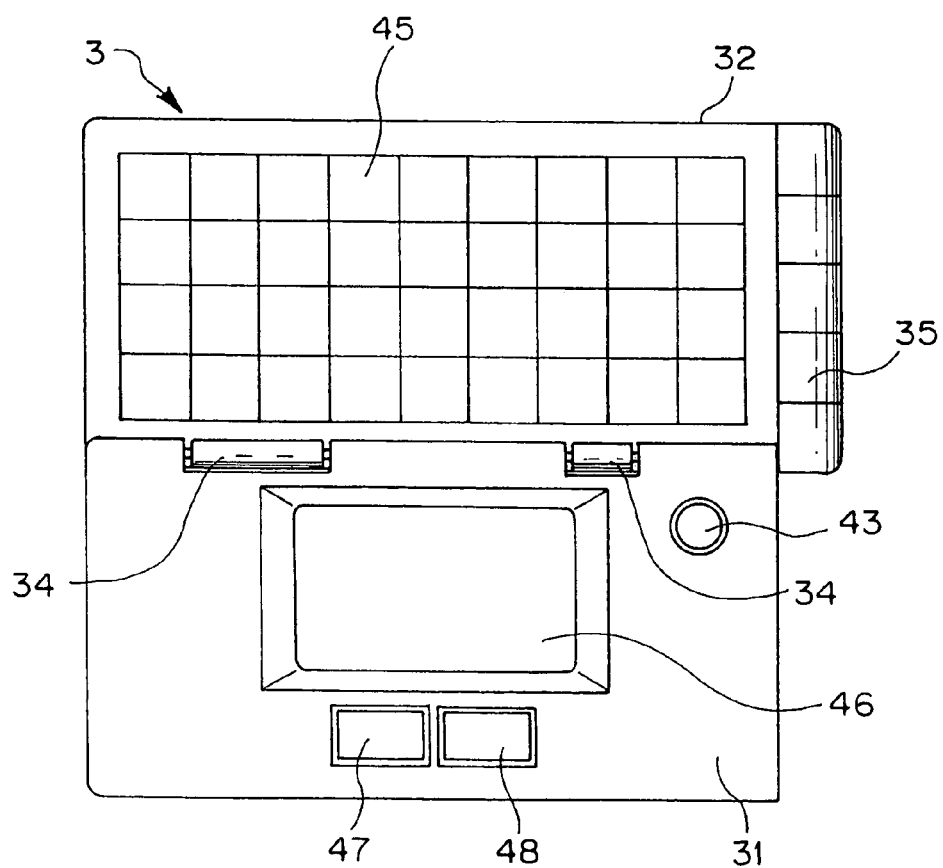
FIG. 10 is a plan view illustrating the mobile information apparatus according to the first embodiment when only an upper body of equipment is unfolded.

The external appearance and the overview of the mobile information apparatus are described next with reference to FIGS. 6 to 11. FIG. 6 is a plan view of the mobile information apparatus when all of the bodies of equipment are folded. FIG. 7 is a right side view of the mobile information apparatus 3 when all of the bodies of equipment are folded. FIG. 8 is a bottom view of the mobile information apparatus when all of the bodies of equipment are folded. FIG. 9 is a rear view of the mobile information apparatus 3 when all of the bodies of equipment are folded. FIG. 10 is a plan view of the mobile information apparatus when only an upper body of equipment is unfolded. FIG. 11 is a plan view of the mobile information apparatus when the upper body of equipment is folded and a middle body of equipment is unfolded.

The mobile information apparatus 3 is made from three substantially rectangular plate-like layers, namely, an upper body of equipment 31, a middle body of equipment 32, and a lower body of equipment 33 stacked in the thickness direction.

As shown in FIG. 10, the upper body of equipment 31, which is a first body of equipment, is attached to the middle body of equipment 32 in a rotatable manner about a hinge 34, which is a first hinge. The hinge 34 has a well known structure so that the hinge 34 includes an electrical contact point between the upper body of equipment 31 and the middle body of equipment 32.

Figure 11:
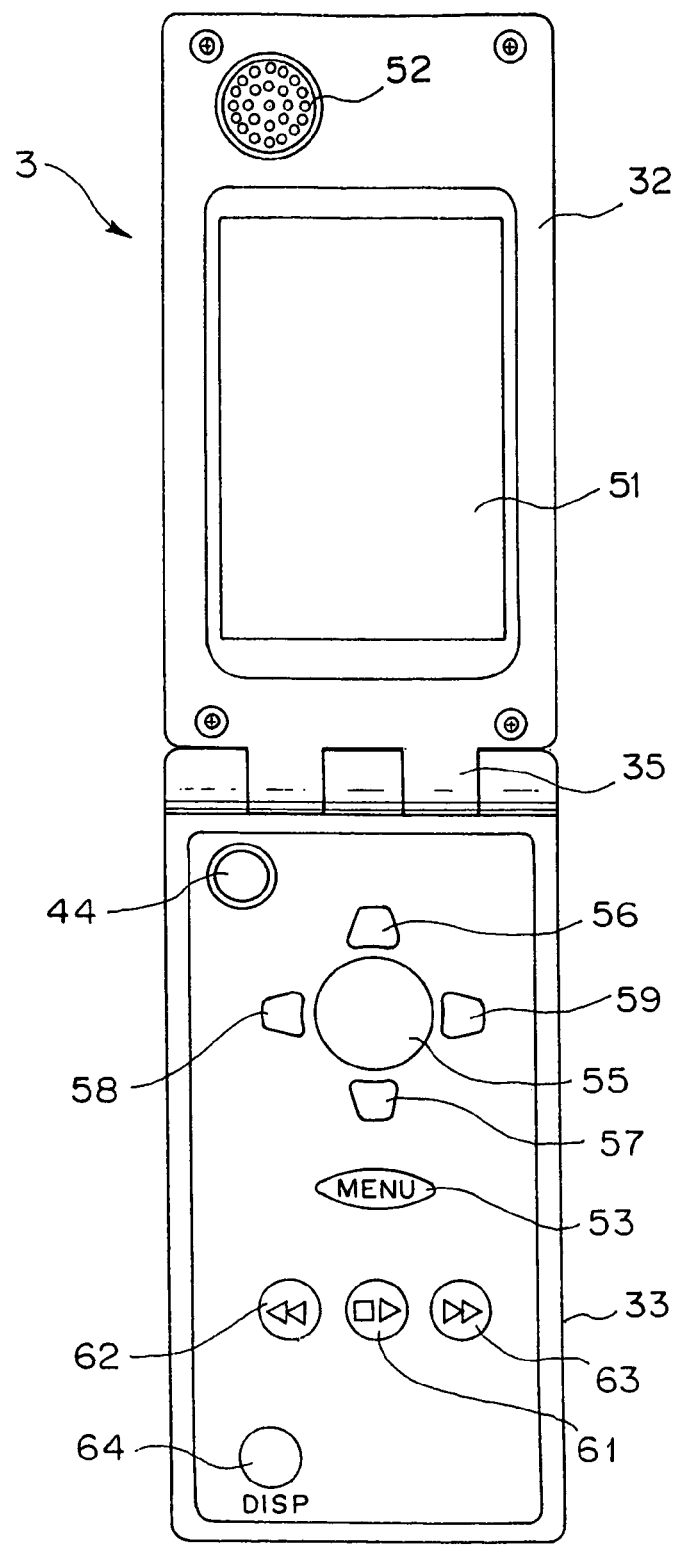
FIG. 11 is a plan view illustrating the mobile information apparatus according to the first embodiment when the upper body of equipment is folded and a middle body of equipment is unfolded.

As shown in FIG. 11, the middle body of equipment 32, which is a second body of equipment, is attached to the lower body of equipment 33 in a rotatable manner about a hinge 35, which is a second hinge. The hinge 35 has a well known structure so that the hinge 35 includes an electrical contact point between the middle body of equipment 32 and the lower body of equipment 33. The axis direction of the hinge 34 is perpendicular to the axis direction of the hinge 35.

As shown in FIGS. 7 and 8, the lower body of equipment 33, which is a third body of equipment, includes a battery container 36 at its bottom. By sliding a cover 37 in the left direction in FIG. 8, a built-in releasable battery can be removed and replaced with a new one. As shown in FIG. 7, a recording medium container 41 for holding a recording medium, such as a removable card memory, is provided at the right side of the lower body of equipment 33. A user operates an eject button 42 to remove the recording medium.

FIG. 10 illustrates the configuration in which the upper body of equipment 31 is unfolded about the hinge 34.

When the upper body of equipment 31 is unfolded about the hinge 34, the bottom of the upper body of equipment 31 is exposed (in the unfolded configuration shown in FIG. 10, the bottom of the upper body of equipment 31 becomes the top). As shown in FIG. 10, a first power switch 43, a pad-based pointing device 46, a left button 47, and a right button 48 are arranged on the bottom of the upper body of equipment 31.

The first power switch 43 is signal generation means for generating a signal to supply electric power to a circuit that causes the mobile information system 1 to function as an information input device. In this embodiment, the first power switch 43 is an independent power switch operated by the finger of a user. However, the first power switch 43 is not limited thereto. For example, the first power switch 43 may be a switch triggered by the rotational operation of the hinge 34. In this case, for example, the first power switch 43 may be incorporated in the hinge 34. This structure allows the mobile information system 1 to function as an information input device simply by unfolding the upper body of equipment 31.

When the middle body of equipment 32 is unfolded, the top surface of the middle body of equipment 32 is exposed. As shown in FIG. 10, a keyboard 45 for inputting, for example, character information is provided on the top surface of the middle body of equipment 32.

Accordingly, as shown in FIG. 10, when only the upper body of equipment 31 is unfolded, the mobile information apparatus 3 functions as an operation switch allowing an operation identical to a keyboard and a mouse of a regular personal computer.

Subsequently, FIG. 11 illustrates the configuration in which the upper body of equipment 31 is folded and the middle body of equipment 32 is unfolded about the hinge 35 with respect to the lower body of equipment 33.

In the configuration shown in FIG. 11, the mobile information apparatus 3 functions as a playback device for displaying an image and functions as an operation switch for operating the playback device. The mode in which the mobile information system 1 is used as a playback device, as shown in FIG. 11, is referred to as a "playback mode".

When the middle body of equipment 32 is unfolded, the bottom surface of the middle body of equipment 32 is also exposed (in the unfolded configuration shown in FIG. 11, the bottom of the middle body of equipment 32 becomes the top). As shown in FIG. 11, a speaker 52 for producing sound and an LCD 51 for displaying a playback screen are provided on the bottom surface of the middle body of equipment 32. The LCD 51 is second display means.

When the lower body of equipment 33 is unfolded, the top surface of the lower body of equipment 33 is also exposed. As shown in FIG. 11, a second power switch 44, a menu button 53, a determination switch 55, menu selection switches 56, 57, 58, and 59, a playback start/stop switch 61, a fast reverse switch 62, a fast forward switch 63, and a display selection switch 64 are arranged on the top surface of the lower body of equipment 33.

The second power switch 44 is located at, for example, the upper left corner on the surface of the lower body of equipment 33. The second power switch 44 is signal generation means for generating a signal to supply electric power to a circuit that causes the mobile information system 1 to function as a playback device. In this embodiment, the second power switch 44 is an independent power switch operated by the finger of a user. However, the second power switch 44 is not limited thereto. For example, the second power switch 44 may be a switch triggered by the rotational operation of the hinge 35. In this case, for example, the second power switch 44 may be incorporated in the hinge 35. This structure allows the mobile information system 1 to function as a playback device simply by unfolding the middle body of equipment 32.

Thus, the first power switch 43 and the second power switch 44 are considered to be mode selection switches that cause the mobile information system 1 to function as either an information input device or a playback device.

The display selection switch 64, which is selection means, is included in a second operation switch 73, which is described below with reference to FIG. 12. The display selection switch 64 is arranged at, for example, the lower left corner on the surface of the lower body of equipment 33. The display selection switch 64 is an automatic return switch. While the mobile information system 1 functions as a playback device, a first display mode, in which information is displayed on the LCD 51, and a second display mode, in which information is displayed on the head-mounted unit 2, are switched every time the display selection switch 64 is pressed to turn on.

In an initial state in which the middle body of equipment 32 is unfolded and the second power switch 44 is turned on, the mobile information apparatus 3 first transmits, to the head-mounted unit 2, a signal for determining whether the head-mounted unit 2 is in an unavailable state.

Subsequently, the head-mounted unit 2 transmits a signal indicating whether the head-mounted unit 2 is in an unavailable state or not to the mobile information apparatus 3 when a power supply circuit 92 (see FIG. 13) of the head-mounted unit 2 is powered on. In contrast, if the power supply circuit 92 is powered off, obviously no signal is returned. Consequently, the mobile information apparatus 3 can determine whether the power supply circuit 92 is powered on or off by determining whether the mobile information apparatus 3 has received a reply from the head-mounted unit 2. In some cases, although a user has powered on the head-mounted unit 2, the power supply circuit 92 is forced to turn off due to a power-saving function when the head-mounted unit 2 is not used for a predetermined time. Even in such a case, the mode of the power supply circuit 92 of the head-mounted unit 2 can be determined by the presence of a reply from the head-mounted unit 2. If the mobile information apparatus 3 does not receive a reply from the head-mounted unit 2, the mobile information apparatus 3 determines that the head-mounted unit 2 is in an unavailable state.

When the mobile information apparatus 3 receives a reply from the head-mounted unit 2, the mobile information apparatus 3 further determines whether the reply is a signal indicating a usable state or a signal indicating an unavailable state.

If the power supply circuit 92 is powered on, but at least one of the switch 27 and the switch 28 is opened (i.e., is turned off), the head-mounted unit 2 sends a reply indicating an unavailable state.

That is, when both the switch 27 and the switch 28 are closed and the power supply circuit 92 is powered on, the mobile information apparatus 3 determines that the head-mounted unit 2 is in a usable state. When at least one of the switch 27 and the switch 28 is opened or when the power supply circuit 92 is powered off, the mobile information apparatus 3 determines that the head-mounted unit 2 is in an unavailable state.

Subsequently, when the mobile information apparatus 3 determines that the head-mounted unit 2 is in a usable state, the mobile information apparatus 3 selects the second display mode. On the other hand, when the mobile information apparatus 3 determines that the head-mounted unit 2 is in an unavailable state, the mobile information apparatus 3 selects the first display mode.

Thus, the mobile information apparatus 3 determines which is more appropriate for displaying on: the LCD 104 of the head-mounted unit 2 or the LCD 51 of the mobile information apparatus 3, and then selects the appropriate LCD.

This structure allows a user to check information by displaying it on the mobile information apparatus 3 even when the head-mounted unit 2 is removed from the head of the user.

Furthermore, the user can view information displayed on an appropriate display unit without the need to perform an operation to select the first display mode or the second display mode. Accordingly, the mobile information system 1 can be easy to operate.

When the mobile information apparatus 3 asks the head-mounted unit 2 if the head-mounted unit 2 is in a usable state and receives no reply, the mobile information apparatus 3 determines that the head-mounted unit 2 is in an unavailable state and automatically selects the LCD 51 of the mobile information apparatus 3 to display information. Thus, even when power supplied to the head-mounted unit 2 is completely turned off or even when the head-mounted unit 2 is located outside the wireless signal transmission range from the mobile information apparatus 3 (in particular, when the head-mounted unit 2 is held in a bag that does not transmit radio waves or when the head-mounted unit 2 is left at home and only the mobile information apparatus 3 is carried around), the display mode can be appropriately and immediately selected to view information without the need for a troublesome operation.

Furthermore, since information is not displayed on the head-mounted unit 2 and the mobile information apparatus 3 at the same time, the unnecessary power consumption can be saved.

Still furthermore, in the mobile information system 1, since each of the mobile information apparatus 3 and the head-mounted unit 2 has a power supply, a cable for supplying electric power to the head-mounted unit 2 is not required. That is, the head-mounted unit 2 does not require a cable for a video signal and the cable for a power supply. This wireless design is convenient for a user to carry around the mobile information system 1.

Referring back to FIG. 11, the playback start/stop switch 61 is used to start and pause playing back image information recorded in a recording memory 83 (or a hard disk 85), which is described below with reference to FIG. 12.

The fast reverse switch 62 is used to fast-reverse and search an image recorded in the recording memory 83 (or the hard disk 85) in the direction opposite to the forward playback direction.

The fast forward switch 63 is used to fast-forward and search an image recorded in the recording memory 83 (or the hard disk 85) in the forward playback direction.

The menu button 53 used to display a menu screen for setting a variety of functions associated with image editing on the LCD 51.

The menu selection switches 56, 57, 58, and 59 are used to move the item of interest up, down, left and right in menu items displayed on the menu screen, or to scroll information displayed on the menu screen.

The determination switch 55 is used to activate the items of interest on menu items displayed on the menu screen.

As described below, the mobile information system 1 according to this embodiment enters a power-saving mode to reduce the total power consumption of the mobile information system 1 when a time period in which an image displayed in a display frame indicating an image display region disappears exceeds a predetermined time period $T_s$. The predetermined time period $T_s$ can be determined by operating the menu button 53, the menu selection switches 56, 57, 58, or 59, and the determination switch 55.

Figure 12:
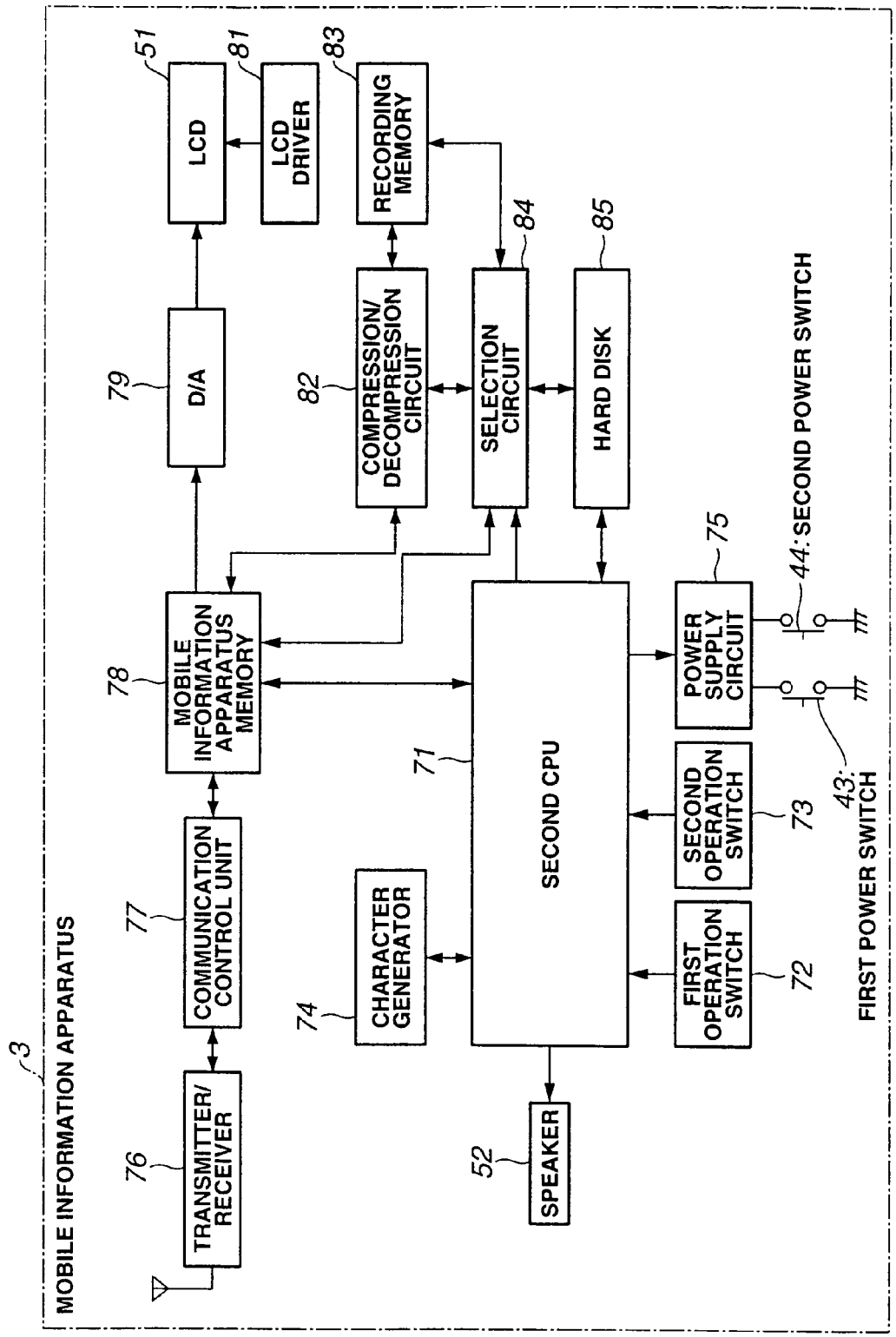
FIG. 12 is a block diagram primarily illustrating the configuration of electronic circuits of the mobile information apparatus in the mobile information system according to the first embodiment.

FIG. 12 is a block diagram primarily illustrating electronic circuits of the mobile information apparatus 3 in the mobile information system 1.

The mobile information apparatus 3 includes a transmitter/receiver 76, a communication control unit 77, a mobile information apparatus memory 78, a digital-to-analog (D/A) circuit 79, the LCD 51, an LCD driver 81, a compression/decompression circuit 82, a selection circuit 84, the recording memory 83, the hard disk 85, the speaker 52, a first operation switch 72, a second operation switch 73, a character generator 74, a power supply circuit 75, the first power switch 43, the second power switch 44, and a second CPU (central processing unit) 71.

The transmitter/receiver 76 receives a radio signal transmitted from the head-mounted unit 2 via an antenna or transmits a radio signal to the head-mounted unit 2 via the antenna. The transmitter/receiver 76 functions as both second transmitting means and second receiving means.

The communication control unit 77 is communication control means for synchronizing frames (synchronization based on a frame in a time-division multiplex system) and data-formatting a slot, which is a component of the frame and which includes a pair of an attribute and an attribute value. The communication control unit 77 functions as an element constituting the second transmitting means and the second receiving means.

The mobile information apparatus memory 78 is storage means comprising a frame buffer, or the like, for temporarily storing characters and images generated by and output from the second CPU (central processing unit) 71 and characters and images stored in and read from the removable recording memory 83 or the hard disk 85.

The D/A circuit 79 is a circuit for converting a digital signal stored in the mobile information apparatus memory 78 to an analog signal.

The LCD 51 is display means for displaying an image based on an analog image signal converted by the D/A circuit 79.

The LCD driver 81 is display-drive control means for controlling driving of the LCD 51.

The compression/decompression circuit 82 is compression/decompression means for compressing a digital signal stored in the mobile information apparatus memory 78 and decompressing a compressed digital signal read out of the recording memory 83.

The selection circuit 84 is input and output selection means for bi-directionally selecting an input source and an output target of a signal based on a control signal from the second CPU 71. As used herein, the term "bi-directionally" means that any of the mobile information apparatus memory 78, the recording memory 83, the hard disk 85, and the compression/decompression circuit 82 can be the input source or the output target of a signal. For example, the selection circuit 84 selects one of the recording memory 83, the hard disk 85, and the mobile information apparatus memory 78, and outputs a digital signal compressed by the compression/decompression circuit 82 to the selected one. When storing information recorded in the recording memory 83 or the hard disk 85 into the mobile information apparatus memory 78 to play back and display the information, the selection circuit 84 selects one of output signals from the recording memory 83 and the hard disk 85 based on a control signal from the second CPU 71 and outputs the selected signal to the compression/decompression circuit 82. Furthermore, when transferring data from the mobile information apparatus memory 78 to the recording memory 83 or the hard disk 85 or transferring data from the recording memory 83 or the hard disk 85 to the mobile information apparatus memory 78, the selection circuit 84 selects one of data transfer schemes using the compression/decompression circuit 82 and not using the compression/decompression circuit 82 based on a control signal from the second CPU 71. If the information contains image data except character data (hereinafter "image data" is referred to as any data excluding character data), the information is transferred after the compression/decompression circuit 82 carries out a compression or decompression process. In contrast, if the information contains character data, the information is transferred without being processed by the compression/decompression circuit 82.

The recording memory 83 includes, for example, a removable card memory. The recording memory 83 is held in the recording medium container 41. The recording memory 83 is recording means for recording a digital signal compressed by the compression/decompression circuit 82 when the selection circuit 84 selects the recording memory 83.

The hard disk 85 is incorporated in the mobile information apparatus 3. The hard disk 85 is recording means for recording a digital signal compressed by the compression/decompression circuit 82 when the selection circuit 84 selects the hard disk 85.

The speaker 52 is sound producing means for playing back sound, for example, accompanied with an image under the control of the second CPU 71 when the image is played back.

The first operation switch 72, namely, a first operation member is input means, including a variety of switches shown in FIG. 10, for inputting various operations when the mobile information system 1 functions as an information input device.

The second operation switch 73, namely, a second operation member is input means, including a variety of switches shown in FIG. 11, for inputting various operations when the mobile information system 1 functions as a playback device.

The character generator 74 is character information generation means for generating character data.

The power supply circuit 75, namely, a second power supply is power supply means for supplying electric power to the mobile information apparatus 3. The power supply circuit 75 includes a removable battery held in the battery container 36.

The first power switch 43 is connected to the power supply circuit 75. As stated above, the first power switch 43 is a switch for supplying electric power to the circuit that causes the mobile information system 1 to function as an information input device. When the first power switch 43 is turned on, all circuits except the second operation switch 73, the D/A circuit 79, the LCD 51, and the LCD driver 81 are allowed to be powered on.

The second power switch 44 is connected to the power supply circuit 75. As stated above, the second power switch 44 is a switch for supplying electric power to the circuit that causes the mobile information system 1 to function as a playback device. When the second power switch 44 is turned on, all circuits except the first operation switch 72 are allowed to be powered on.

The second CPU 71 controls each circuit in the mobile information apparatus 3. The second CPU 71 also controls the head-mounted unit 2 by communicating with a first CPU 91 in the head-mounted unit 2. The first CPU 91 is described below with reference to FIG. 13. The second CPU 71 is control means for performing overall control of the mobile information system 1. Furthermore, the second CPU 71 functions as display data generation means and selection means.

FIG. 13 is a block diagram illustrating the configuration of, mainly, an electronic circuit of the head-mounted unit 2 in the mobile information system 1.

The head-mounted unit 2 includes a transmitter/receiver 111, a communication control unit 112, a memory 113, the switches 27 and 28, the speaker 22, angular velocity sensors 94 and 95, amplifiers 96 and 97, an analog-to-digital (A/D) circuit 98, a light-emitting diode (LED) driver 101, an LED 102, a condenser lens 103, an LCD 104, an LCD driver 105, a first holographic optical element (hereinafter simply referred to as a "HOE") 106, a second HOE 107, the power supply circuit 92, the power switch 23, and the first CPU 91.

Hereinafter, a component including the LED 102, the condenser lens 103, the LCD 104, the first HOE 106, and the second HOE 107 is referred to as a see-through information display portion 108. The see-through information display portion 108 is an element constituting the first display means.

The transmitter/receiver 111 receives display data, audio data, and a variety of control signals wirelessly transmitted from the mobile information apparatus 3. The transmitter/receiver 111 also wirelessly transmits a variety of signals to the mobile information apparatus 3. The transmitter/receiver 111 functions as both first transmitting means and first receiving means.

The communication control unit 112 is communication control means including a receiving side for receiving data transmitted from the mobile information apparatus 3 via the transmitter/receiver 111 and a transmitting side for transmitting data to the mobile information apparatus 3 via the transmitter/receiver 111. The communication control unit 112 functions as an element constituting the first transmitting means and the first receiving means.

The receiving portion of the communication control unit 112 retrieves data for a slot from received data supplied from a built-in modem in the transmitter/receiver 111 at a predetermined timing. The receiving portion then extracts a synchronization signal from the data, generates a frame synchronization signal, and descrambles the data. Thereafter, the receiving portion delivers display data transmitted from the mobile information apparatus 3 and display control data of the head-mounted unit (e.g., a display start signal and a display stop signal) to the first CPU 91.

Subsequently, the transmitting portion of the communication control unit 112 scrambles angular velocity information (or angular information computed based on the angular velocity information) output via the first CPU 91 and adds a synchronization signal to the information. The transmitting portion then generates transmission data for a slot, inserts the transmission data to a predetermined slot in a frame at a predetermined timing, and delivers the slot to the modem in the transmitter/receiver 111.

The memory 113 temporarily stores display data and audio data received from the mobile information apparatus 3. Also, the memory 113 serves as memory means capable of temporarily storing data to be transmitted to the mobile information apparatus 3. The memory 113 is connected to the first CPU 91.

The switches 27 and 28, as stated above, are used to detect an open and closed state of the temples 12.

The speaker 22, as stated above, serves as sound producing means for producing sound so that a user wearing the head-mounted unit 2 can listen to sound by, for example, the left ear.

The angular velocity sensor 94 serves as angular velocity detection means for detecting an angular velocity of the head of an observer wearing the head-mounted unit 2 in the yaw direction (in the rightward and leftward directions).

The angular velocity sensor 95 serves as angular velocity detection means for detecting an angular velocity of the head of the observer wearing the head-mounted unit 2 in the pitch direction (in the forward and backward direction).

The amplifier 96 serves as amplifying means for amplifying the output of the angular velocity sensor 94.

The amplifier 97 serves as amplifying means for amplifying the output of the angular velocity sensor 95.

The A/D circuit 98 converts the analog outputs from the angular velocity sensors 94 and 95 to digital signals after the analog outputs are amplified by the amplifiers 96 and 97. The A/D circuit 98 then output the digital signals to the first CPU 91.

The LED driver 101 serves as light emitting control means for controlling the LED 102 to emit light under the control of the first CPU 91.

The LED 102 is a light source driven by the LED driver 101 to emit light. The LED 102 serves as an element constituting the display means.

The condenser lens 103 condenses light emitted from the LED 102. The condenser lens 103 also serves as an element constituting the display means.

The LCD 104 is a display element composed of, for example, a transmissive liquid crystal display for displaying information, such as an image. The LCD 104 includes a plurality of display pixels evenly spaced in a two-dimensional plane. The LCD 104 also serves as an element constituting the display means. Light emitted from the LED 102 and condensed by the condenser lens 103 illuminates the LCD 104 from the back of the LCD 104.

The LCD driver 105 serves as display control means for, under the control of the first CPU 91, transmitting a driving signal to the LCD 104 to display a variety of information, such as characters and images, transmitted from the mobile information apparatus 3.

The first HOE 106 is a reflective optical member for reflecting the emitted light via the LCD 104 in the vertical downward direction (see FIG. 16A) while correcting for the parallax, which is described below. The first HOE 106 serves as an element constituting the display means.

The second HOE 107 serves as a combiner for reflecting and diffracting the light from the first HOE 106 towards the observer's eye so as to project the information, such as images and characters, displayed on the LCD 104 so that the observer can view the information and also for transmitting external light towards the observer's eye. The second HOE 107 serves as an element constituting the display means.

The power supply circuit 92 is a first power supply including a control circuit and a battery for supplying electric power to the whole head-mounted unit 2. Upon receiving a power-supply instruction signal from the mobile information apparatus 3 via the first CPU 91, the whole head-mounted unit 2 is automatically supplied with the electric power from the battery.

The power switch 23, as described with reference to FIG. 3, is a switch for powering on and off the head-mounted unit 2.

The first CPU 91 is control means for primarily controlling the head-mounted unit 2 while communicating with the second CPU 71 of the mobile information apparatus 3. The first CPU 91 also serves as angle detection means for detecting the tilt angle of the head of the observer based on the angular velocity information output from the angular velocity sensors 94 and 95.

The overview of operations of the above-described head-mounted unit 2 and the mobile information apparatus 3 is described next.

First, the upper body of equipment 31 is unfolded and the first power switch 43 is pressed. Then, the mobile information system 1 functions as an information input device. Accordingly, the second operation switch 73, the D/A circuit 79, the LCD 51, and the LCD driver 81, all of which are circuits operating only when, as described below, the mobile information system 1 is used as a playback device, are not powered on. This control can prevent electric power from being wasted in the circuits unused for the information input device.

Upon detecting a signal indicating the press of the first power switch 43 (i.e., a supply start signal), the second CPU 71 transmits a signal indicating this event (i.e., a power-supply instruction signal) to the head-mounted unit 2 via the communication control unit 77 and the transmitter/receiver 76.

Subsequently, the head-mounted unit 2 receives the power-supply instruction signal from the mobile information apparatus 3 via the transmitter/receiver 111 and the communication control unit 112, and then delivers the received power-supply instruction signal to the first CPU 91.

Upon receiving the power-supply instruction signal, the first CPU 91 delivers a predetermined signal to the power supply circuit 92, which, in turn, starts supplying electric power to the whole head-mounted unit 2. The first CPU 91 also transmits a reception acknowledge signal informing the reception of the power-supply instruction signal to the mobile information apparatus 3 via the transmitter/receiver 111.

To power on the head-mounted unit 2 in conjunction with the power-on of the mobile information apparatus 3, as stated above, at least the first CPU 91, the communication control unit 112, and the transmitter/receiver 111 must be in a ready state in which a signal from the second CPU 71 can be received. Accordingly, when the power switch 23 is turned on, minimum electric power is always supplied to these circuits. In contrast, when the power switch 23 is turned off, electric power is not supplied to the first CPU 91, the communication control unit 112, and the transmitter/receiver 111. That is, when the power switch 23 is open (i.e., is turned off), all of the power supplies in the head-mounted unit 2 are in an OFF state. Therefore, power control in conjunction with the first power switch 43 of the mobile information apparatus 3 is not carried out.

Thus, to power on the head-mounted unit 2 in conjunction with the power-on of the mobile information apparatus 3, the power switch 23 must be turned on in advance. In this case, some electric power is always consumed. However, since the operation of the power switch 23 is not required, the operation is advantageously simplified.

Additionally, the second CPU 71 of the mobile information apparatus 3 monitors whether a predetermined time period has elapsed since the head-mounted unit 2 was powered on. If it is determined that the predetermined time period has elapsed, the mobile information apparatus 3 transmits a predetermined power-off signal to the head-mounted unit 2.

Thus, when the predetermined time period has elapsed, the head-mounted unit 2 is automatically powered off.

The mobile information system 1 has the same function as text generation software (or text input software) for regular personal computers while the upper body of equipment 31 is unfolded (see FIG. 10).

That is, when the first operation switch 72 is operated, character information in accordance with the operation is read out of the character generator 74 and is edited into text data by the second CPU 71.

A display frame is added to the edited data, as described below, and the display position of the data is controlled so that the data is to be displayed at a predetermined position on the LCD 104 of the head-mounted unit 2. The data is then transmitted to the head-mounted unit 2 via the communication control unit 77 and the transmitter/receiver 76. The predetermined position on the LCD 104 of the head-mounted unit 2 is determined depending on the tilts in the yaw and pitch directions calculated based on the angular velocity information of the head transmitted from the head-mounted unit 2.

The head-mounted unit 2 receives the text data to which the display frame is added and whose display position is determined via the transmitter/receiver 111 and communication control unit 112, and temporarily stores the text data in the memory 113.

The text data stored in the memory 113 is delivered by the first CPU 91 to the LCD driver 105 to be displayed on the LCD 104.

At the same time, the first CPU 91 drives the LED driver 101 to emit light from the LED 102. The light emitted from the LED 102 is converted to parallel light by the condenser lens 103 to illuminate the LCD 104 from the back thereof.

As stated above, the light propagating through the LCD 104 is reflected by the first HOE 106 and is incident on the observer's eye via the second HOE 107, which functions as a combiner. Thus, the observer can view the text data as a virtual image superimposed on an external image.

Thereafter, as shown in FIG. 11, when the second power switch 44 is closed (i.e., is turned on) with the upper body of equipment 31 folded and with the middle body of equipment 32 unfolded, the mobile information system 1 functions as a playback device. As stated above, when the second power switch 44 is closed, circuits excluding the predetermined circuits including at least the first operation switch 72 are allowed to be powered on.

The control in which the power supply of the head-mounted unit 2 is controlled in conjunction with the operation of the second power switch 44 is the same as the above-described control in which the power supply of the head-mounted unit 2 is controlled in conjunction with the operation of the first power switch 43.

By operating the menu button 53, the menu selection switches 56, 57, 58, or 59, and the determination switch 55 included in the second operation switch 73, an information item recorded in the recording memory 83 or the hard disk 85 is selected. By operating the playback start/stop switch 61 to instruct playback, the following operation is carried out.

First, if the information in the selected one of the recording memory 83 and the hard disk 85 is image data, the image data is decompressed by a decompression circuit in the compression/decompression circuit 82 and is temporarily stored in the mobile information apparatus memory 78.

In contrast, if the information in the selected one of the recording memory 83 and the hard disk 85 is character data, the character data is temporarily stored in the mobile information apparatus memory 78 without being processed by the compression/decompression circuit 82.

The information stored in the mobile information apparatus memory 78 is then converted to an analog image signal by the D/A circuit 79 and is displayed on the LCD 51. Alternatively, the analog image signal is transmitted to the head-mounted unit 2 and is displayed on the LCD 104 of the see-through information display portion 108. In this case, the operation of the LCD 51 is controlled by a driving signal generated by the LCD driver 81 based on the instruction of the second CPU 71.

When the mobile information system 1 is set to the first display mode (i.e., a mode in which an image is displayed on the LCD 51 of the mobile information apparatus 3) by operating the display selection switch 64 shown in FIG. 11, the following operation is carried out.

First, by operating the second operation switch 73 in a predetermined manner, a variety of types of information, such as a character, sound, and image, recorded in the recording memory 83 or the hard disk 85 is selected by the selection circuit 84 and is temporarily stored in the mobile information apparatus memory 78.

Among these information items, display data, such as an image and a character, is converted to analog data by the D/A circuit 79 and is displayed on the LCD 51 under the control of the LCD driver 81.

Among these information items, audio data is played back by the speaker 52 under the control of the second CPU 71.

On the other hand, when the mobile information system 1 is set to the second display mode (i.e., a mode in which an image is displayed on the LCD 104 of the head-mounted unit 2) by operating the display selection switch 64, the following operation is carried out.

First, by operating the second operation switch 73 in a predetermined manner, a variety of types of information, such as a character, sound, and image, recorded in the recording memory 83 or the hard disk 85 is selected by the selection circuit 84 and is temporarily stored in the mobile information apparatus memory 78.

Among these information items, a display frame is added to display data, such as an image and a character, as described below. The display data is controlled so that the display data is to be displayed at a predetermined position on the LCD 104 of the head-mounted unit 2. The display data is then transmitted to the head-mounted unit 2 via the communication control unit 77 and the transmitter/receiver 76. As stated above, the predetermined position on the LCD 104 is determined depending on the tilts of the head in the yaw and pitch directions calculated based on the angular velocity information (or angle information) of the head transmitted from the head-mounted unit 2. The head-mounted unit 2 receives these various types of information via the transmitter/receiver 111 and the communication control unit 112, and temporarily stores the information in the memory 113. These images and characters are then displayed by the see-through information display portion 108.

Among these information items, audio data is transmitted to the head-mounted unit 2 via the communication control unit 77 and the transmitter/receiver 76. In the same manner as for the display data, the head-mounted unit 2 receives these various types of information via the transmitter/receiver 111 and the communication control unit 112, and temporarily stores the information in the memory 113. This audio data is then played back by the speaker 22 under the control of the first CPU 91.

Figure 14:
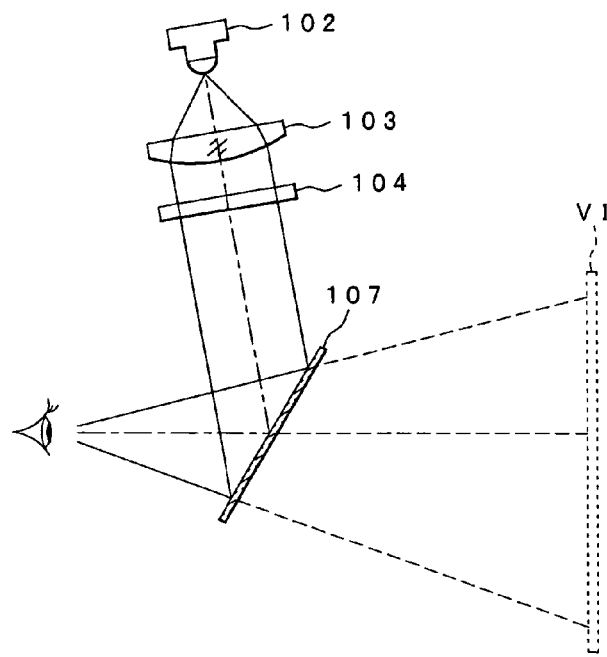
FIG. 14 illustrates the principle of an optical system of a see-through information display portion according to the first embodiment.

The optical structure of the see-through information display portion 108 is described next with reference to FIGS. 14 through 17. FIG. 14 illustrates the principle of the optical system of the see-through information display portion 108.

Figure 15:
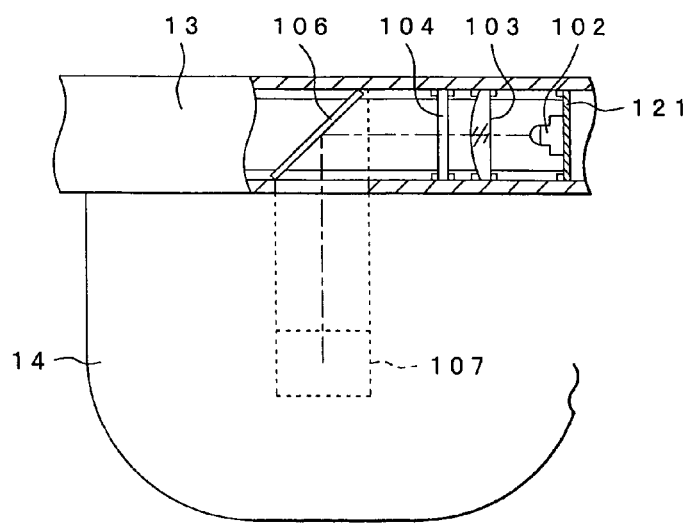
FIG. 15 is a front view, partially in section, illustrating the configuration of the optical system of the see-through information display portion according to the first embodiment.

FIG. 15 is a front view, partially in section, illustrating the configuration of the optical system of the see-through information display portion 108. FIGS. 16A and 16B are left side views illustrating examples of the configuration of the optical system of the see-through information display portion 108. FIG. 17 is a sectional plan view illustrating the configuration of the optical system of the see-through information display portion 108.

In the see-through information display portion 108, a display frame indicating a range in which information, such as images and characters, is displayed can be superimposed as a virtual image on an observation object substantially directly viewed by the observer. Hereinafter, such a display mode is referred to as "see-through display". The term "substantially directly viewing/viewed" includes not only a case where the observer views the object directly with the naked eye, but also a case where the observer views the object through a generally planar transparent member formed of, for example, glass or plastic, or a case where the observer views the object through an eyesight-correcting lens.

The principle of displaying see-through images by the optical system of the see-through information display portion 108 (hereinafter referred to as the "see-through information display optical system") in this embodiment is described below with reference to FIG. 14.

Light emitted from the LED 102 is condensed by the condenser lens 103 and illuminates the LCD 104 from the back thereof. Here, the LED 102 includes diodes capable of emitting three respective light components, namely, R (red), G (green), and B (blue). When the LED 102 displays a color image, all of the three light components are used. However, when a character and the display frame are displayed, the LED 102 can cause only one of the three diodes, for example, the G (green) diode, to emit light.

The first CPU 91 generates a signal corresponding to the display frame indicating the display range and outputs the signal to the LCD driver 105. The LCD driver 105 drives the LCD 104 based on this signal to cause the LCD 104 to display the characters and images.

The characters and images output from the LCD 104 by receiving the light from the LED 102 are reflected by the second HOE 107 and are guided to the observer's eye. Thus, the observer can view the characters and images as a virtual image VI. The first HOE 106 is not shown since only the principle is illustrated in FIG. 15.

The second HOE 107 is a volume-phase holographic optical element using a photosensitive material, such as photopolymer or dichromated gelatin, and is designed to reflect light having R, G, and B wavelengths emitted from the LED 102 with the maximum reflectance. Accordingly, when emitting G light to display characters and images, the green characters and images are clearly displayed as a virtual image. The HOE exhibits excellent wavelength selectivity, and more specifically, the HOE exhibits high reflection characteristics for the R, G, and B wavelength light with extremely narrow wavelength intervals and exhibits high transmission characteristics for the other wavelength light. Accordingly, external light having the same wavelength range as the display light is diffracted and reflected and does not reach the observer's eyes, but external light having the other wavelength ranges reaches the observer's eyes. In general, since visible light has a wide wavelength interval, an external image can be observed without any problem even if light having very narrow wavelength intervals including the R, G, and B wavelengths does not reach the observer's eyes.

The first HOE 106 not only reflects light from the LCD 104 to guide it to the second HOE 107 but also has a function of correcting for the curvature of field. Although in this embodiment the first HOE 106 is used, a free-form optical element may be used. Although the free-form optical element is small and lightweight, it can correct for the complicated aberration, and thus, clear images with small aberration can be displayed without increasing the weight of the head-mounted unit 2.

Specific arrangements of the see-through information display optical system are described below with reference to FIGS. 15 through 17.

In the portion inside the frame 13 on the observation object side and above the transparent optical member 14 (and/or the transparent optical member 15), the LED 102, the condenser lens 103, the LCD 104, and the first HOE 106 are disposed in the order shown in FIG. 15. As shown in FIG. 17, those members are fixed by being sandwiched between support frame portions 124 and 125. In this case, the LED 102 is fixed by the support frame portions 124 and 125 while being mounted on an electronic circuit board 121. As stated above, the first HOE 106 is tilted so that it can reflect light from the LED 102 vertically downward.

The transparent optical member 14 (and/or the transparent optical member 15) includes, as shown in FIGS. 16A and 16B, optical waveguide members 122 and 123 formed of transparent glass or plastic to have a predetermined thickness and the second HOE 107 tilted between the optical waveguide members 122 and 123 to reflect light backward. With this configuration, light reflected by the first HOE 106 propagates inside the optical waveguide member 122 disposed above the second HOE 107 and reaches the second HOE 107. The propagation of light inside the optical waveguide member 122 may be only the transmission, as shown in FIG. 16A, or a combination of the transmission and internal total reflection may be employed, as shown in FIG. 16B. If the optical system is designed to implement the configuration shown in FIG. 16B, the transparent optical member 14 (and/or the transparent optical member 15) can be thin-walled, thereby further reducing the weight of the head-mounted unit 2.

As shown in FIG. 17, at the side of the observer's head (opposite to the observation object) inside the frame 13, an electronic circuit board 126 mounting the LED driver 101 and LCD driver 105 is disposed on the opposite side of the see-through information display optical system with the support frame portion 124 therebetween.

Among the above-described members, the see-through information display optical system includes the LED 102, the condenser lens 103, the LCD 104, the first HOE 106, the second HOE 107, and the optical waveguide members 122 and 123.

In general, since the observer views an observation object by both eyes, the following two configurations of the see-through information display portion 108, for example, can be proposed.

In a first example of the configurations, a portion corresponding to one eye is composed of the see-through information display optical system as shown in FIG. 15, and a portion corresponding to the other eye is composed of a simple transparent optical member without a see-through information display function. In this case, the transparent optical member for the other eye preferably exhibits the same luminance transmittance characteristic as the transparent optical member 14 (or the transparent optical member 15), thereby reducing the eye fatigue even when the observer uses the head-mounted unit 2 for a long period of time.

In a second example of the configurations, the see-through information display optical system shown in FIG. 15 is provided for each of the two eyes. This configuration using two see-through information display optical systems can further reduce the eye fatigue and also allows a three-dimensional image to be displayed when necessary.

Figure 18:
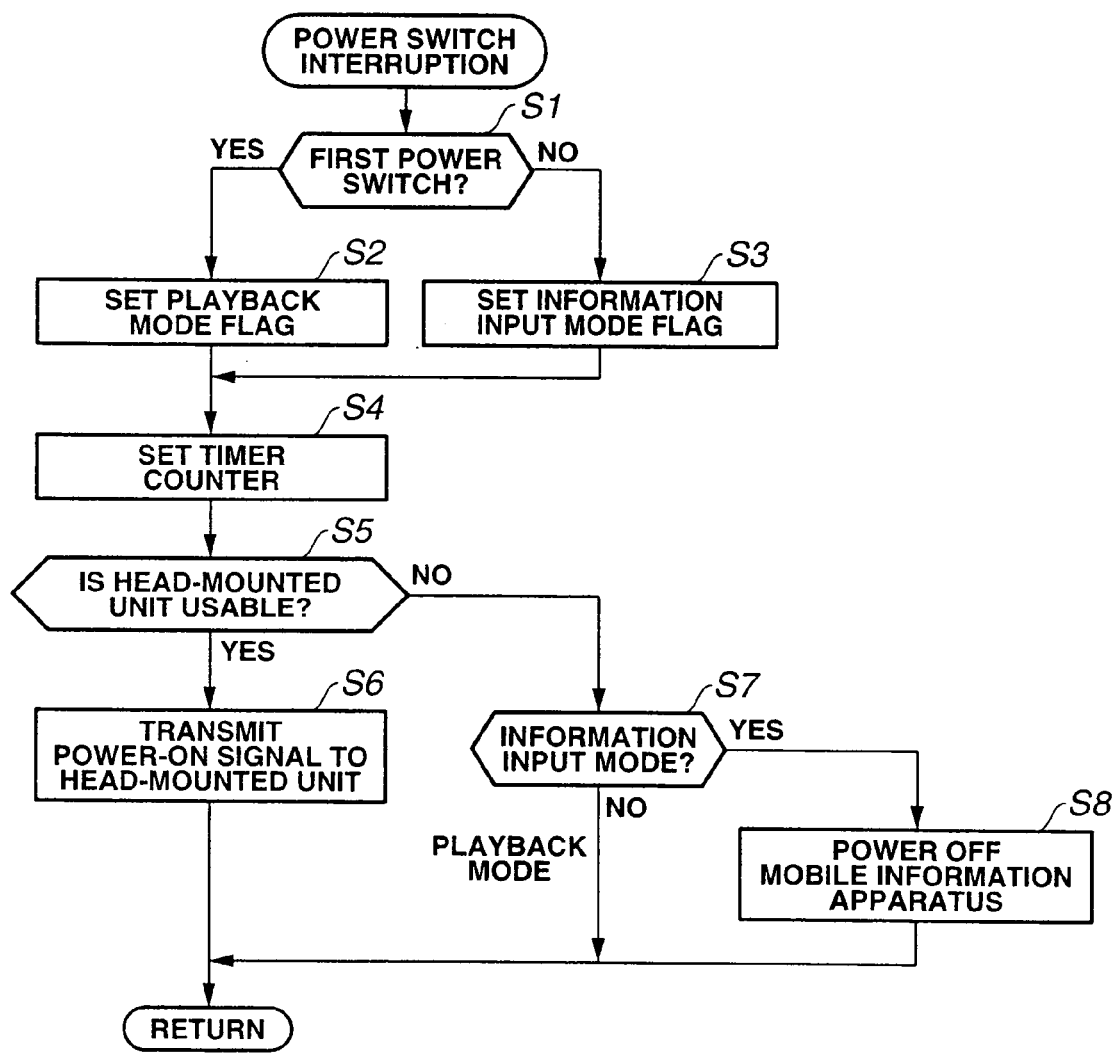
FIG. 18 is a flow chart illustrating power control in the mobile information system according to the first embodiment.

FIG. 18 is a flow chart illustrating power control in the mobile information system 1.

When the first power switch 43 or the second power switch 44 is operated, a power switch interruption process is carried out.

In this process, the second CPU 71 first determines whether the first power switch 43 is turned on (step S1).

If the first power switch 43 is turned on, the second CPU 71 sets a flag (an information input mode flag) which indicates that the mobile information system 1 functions as the information input device (step S2).

In contrast, if the second power switch 44 is turned on, the second CPU 71 sets a flag (a playback mode flag) which indicates that the mobile information system 1 functions as the playback device (step S3).

After the flag is set at either step S2 or step S3, a timer counter is set to count a time from when the first power switch 43 or the second power switch 44 is powered on (step S4). The timer counter is incorporated in the second CPU 71.

Thereafter, it is determined whether the head-mounted unit 2 is usable or not (step S5). As stated above, it is determined that the head-mounted unit 2 is in an unavailable state if the second CPU 71 receives no reply after transmitting a predetermined confirmation to the head-mounted unit 2. If the second CPU 71 has received a reply from the head-mounted unit 2, the second CPU 71 determines whether the head-mounted unit 2 is in an unavailable state or a usable state based on the details of the reply. The criterion for the determination of the state is described above.

If it is determined at step S5 that the head-mounted unit 2 is in a usable state, the second CPU 71 transmits a power-on signal (power-supply instruction signal) to the head-mounted unit 2 and the process returns to a predetermined parent routine (step S6). Thus, electric power is supplied to the whole head-mounted unit 2. As stated above, when the power switch 23 of the head-mounted unit 2 is open, the power supply of the head-mounted unit 2 is forced to be turned off. Accordingly, to supply electric power from the power supply circuit 92 of the head-mounted unit 2 in conjunction with the first power switch 43 or the second power switch 44 of the mobile information apparatus 3, the power switch 23 must be closed (i.e., turned on) in advance.

If, at step S5, the second CPU 71 determines that the head-mounted unit 2 is in an unavailable state, then the second CPU 71 determines whether the mobile information system 1 is in an information input mode (step S7). This is determined based on the flag set at step S2 or step S3.

If it is determined that the mobile information system 1 is in an information input mode, the mobile information apparatus 3 is powered off (step S8), since there is no means for visually checking information input from the mobile information apparatus 3 in a state shown in FIG. 10, that is, in a state in which the head-mounted unit 2 is turned off and the LCD 51 of the mobile information apparatus 3 is not usable. In this embodiment, the mobile information apparatus 3 is powered off. However, the mobile information apparatus 3 may enter a power-saving mode (standby state).

If, at step S7, it is determined that the mobile information system 1 is not in an information input mode, that is, if it is determined that the mobile information system 1 is in a playback mode, the process is completed and returns to the predetermined parent routine.

As stated above, since the information input mode is enabled only when the mobile information apparatus 3 operates in corporation with the head-mounted unit 2, the mobile information apparatus 3 is powered off (steps S7 and S8) immediately after it is determined that the head-mounted unit 2 is in an unavailable state. This control can prevent electric power from being wasted. Furthermore, even when the first power switch 43 or the second power switch 44 is unintentionally operated and the mobile information apparatus 3 is powered on, the power supply is automatically suppressed, thus reducing power consumption.

When the mobile information system 1 is in a playback mode, the mobile information apparatus 3 can independently operate. Accordingly, even if the head-mounted unit 2 is in an unavailable state, the mobile information apparatus 3 remains powered on. In this case, the mobile information apparatus 3 does not simply transmit a power-on signal to the head-mounted unit 2.

Thus, the above-described mobile information system 1 can appropriately supply electric power to the head-mounted unit 2 and the mobile information apparatus 3 by a simple operation.

Figure 19:
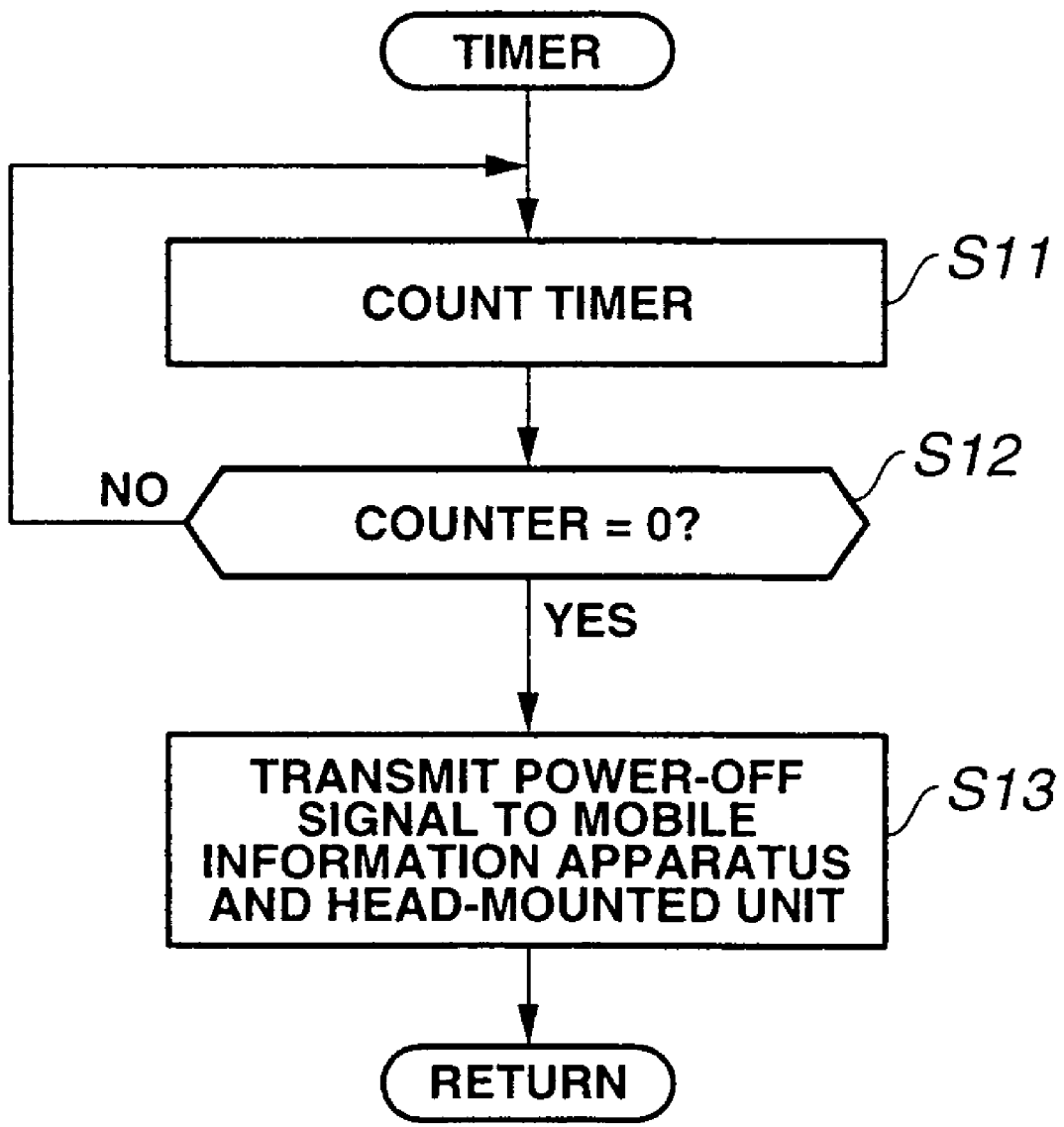
FIG. 19 is a flow chart illustrating the operation of a timer counter which controls a time for supplying electric power to the head-mounted unit and the mobile information apparatus according to the first embodiment.

FIG. 19 is a flow chart illustrating the operation of the timer counter which controls a time for supplying electric power to the head-mounted unit 2 and the mobile information apparatus 3.

First, the timer counter set at step S4 is counted down at a predetermined time interval (step S11).

It is then determined whether the counter value is zero (step S12).

Here, if it is determined that the counter value is not zero, the process returns to step S11 and the timer counter is counted down at the predetermined time interval until the counter value is equal to zero.

If, at step S12, it is determined that the counter value is zero, the second CPU 71 transmits a power-off signal to the power supply circuit 75 of the mobile information apparatus 3 and the head-mounted unit 2 (step S13).

Upon receiving the power-off signal from the mobile information apparatus 3, the first CPU 91 of the head-mounted unit 2 transmits a power-off signal to the power supply circuit 92. Thus, the power supplied from the power supply circuit 92 to the circuits in the head-mounted unit 2 is reduced or is turned off. The first CPU 91 then enters a standby state.

Similarly, the second CPU 71 of the mobile information apparatus 3 transmits a power-off signal to the power supply circuit 75. Thus, the power supplied from the power supply circuit 75 to the circuits in the mobile information apparatus 3 is reduced or is turned off. The second CPU 71 then enters a standby state.

Figure 20:
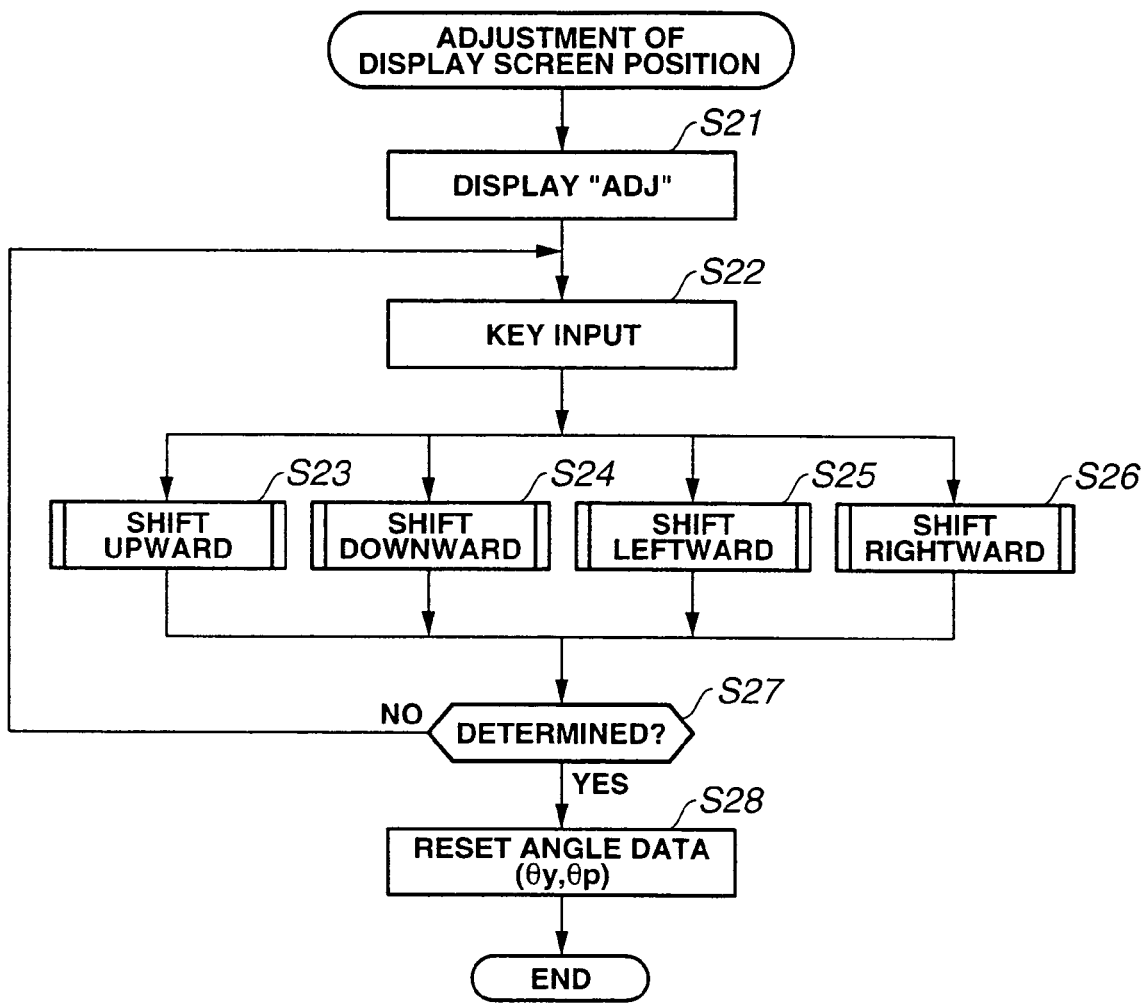
FIG. 20 is a flow chart illustrating a process to adjust the initial position of a display screen according to the first embodiment.
Figure 21:
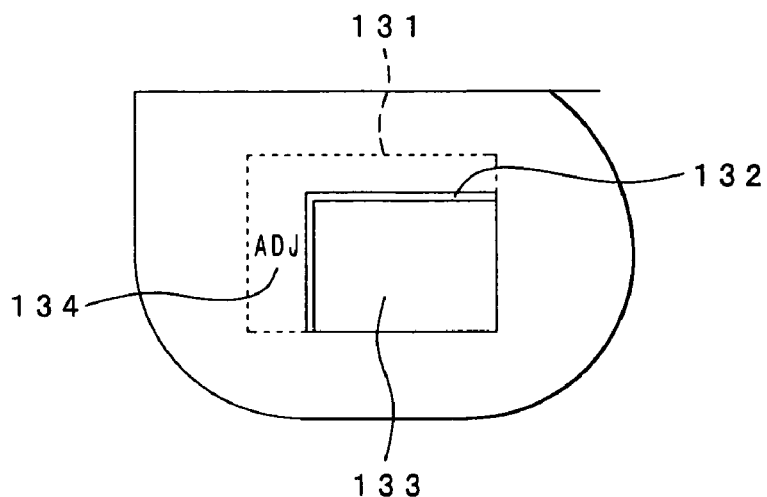
FIG. 21 illustrates a screen example when adjusting the initial position of a display screen according to the first embodiment.
Figure 22:
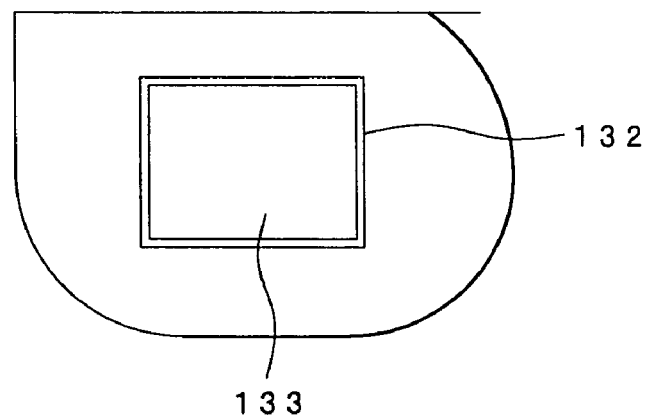
FIG. 22 illustrates a screen example after the initial position of a display screen is adjusted according to the first embodiment.

FIG. 20 is a flow chart illustrating a process to adjust the initial position of a display screen. The process shown in FIG. 20 is described next with reference to FIGS. 21 and 22. FIG. 21 illustrates a screen example when adjusting the initial position of a display screen. FIG. 22 illustrates a screen example after the initial position of a display screen is adjusted.

In the mobile information system 1 according to this embodiment, the head-mounted unit 2 can display information so that, as described below, an observer sees a display image as if the display image is fixed to the external world, for example, as if the observer is viewing a fixed monitor or a television receiver, regardless of the motion of the observer's head. Accordingly, when the observer tilts his or her head, the head-mounted unit 2 shifts the image in real time in response to the tilting in the direction opposite to the head tilting direction by a distance proportional to the amount of the tilt. In the process shown in FIG. 20, a tilt angle of the head is selected and the shift value for the tilt angle is adjusted. Thus, the observer can view a display screen as if a virtual fixed monitor is placed at an optimum observation point.

Here, it is assumed that a screen shown in FIG. 21 is displayed when an observer keeps his or her eyes front. In FIG. 21, a displayable region 131 is shown by a dotted line. A display frame 132 is displayed at the bottom right of the displayable region 131. The inside of the display frame 132 serves as a display screen 133.

In this state, the observer carries out a predetermined key operation via the first operation switch 72 and the second operation switch 73 of the mobile information apparatus 3 to set the mobile information system 1 to an adjustment mode. As shown in FIG. 21, text 134 consisting of a character string "ADJ", which indicates that the mobile information apparatus 3 is in an adjustment mode, is then displayed on the left side of the displayable region 131 (step S21).

The observer then operates a predetermined four-directional key of the mobile information apparatus 3 (e.g., the menu selection switches 56, 57, 58, and 59 shown in FIG. 11 or the pad-based pointing device 46 shown in FIG. 10). The second CPU 71 detects this key input (step S22). During the key input, the second CPU 71 generates display information to move the display frame 132 and the display screen 133 at a predetermined speed in the direction specified by the key operation. The second CPU 71 then stores the display information in the mobile information apparatus memory 78.

That is, when a key operation for moving upward is detected, the second CPU 71 generates, during the key operation, display data to move the display frame 132 and the display screen 133 upward in the displayable region 131 at a predetermined speed, and stores the created display data in the mobile information apparatus memory 78. Thus, the data in the mobile information apparatus memory 78 is wirelessly transferred to the head-mounted unit 2. The head-mounted unit 2 then displays an image moving upward in the displayable region 131 (step S23).

When a key operation for moving downward is detected, the second CPU 71 generates, during the key operation, display data to move the display frame 132 and the display screen 133 downward in the displayable region 131 at a predetermined speed, and stores the created display data in the mobile information apparatus memory 78. Thus, the data in the mobile information apparatus memory 78 is wirelessly transferred to the head-mounted unit 2. The head-mounted unit 2 then displays an image moving downward in the displayable region 131 (step S24).

Furthermore, when a key operation for moving leftward is detected, the second CPU 71 generates, during the key operation, display data to move the display frame 132 and the display screen 133 leftward in the displayable region 131 at a predetermined speed, and stores the created display data in the mobile information apparatus memory 78. Thus, the data in the mobile information apparatus memory 78 is wirelessly transferred to the head-mounted unit 2. The head-mounted unit 2 then displays an image moving leftward in the displayable region 131 (step S25).

Finally, when a key operation for moving rightward is detected, the second CPU 71 generates, during the key operation, display data to move the display frame 132 and the display screen 133 rightward in the displayable region 131 at a predetermined speed, and stores the created display data in the mobile information apparatus memory 78. Thus, the data in the mobile information apparatus memory 78 is wirelessly transferred to the head-mounted unit 2. The head-mounted unit 2 then displays an image moving rightward in the displayable region 131 (step S26).

When one of the operations at steps S23 through S26 is completed, the process waits for a predetermined setting operation by the mobile information apparatus 3 (e.g., the operation of the determination switch 55 shown in FIG. 11 or the click operation of the left button 47 shown in FIG. 10) (step S27). The process proceeds to step S22, where a key input operation is carried out until the setting operation is carried out.

If the setting operation is carried out, the position of the display frame 132 is determined. At the same time, the text 134 consisting of a character string "ADJ", which indicates that the mobile information apparatus 3 is in an adjustment mode, disappears. Thus, the display frame 132 and the display screen 133 shown in, for example, FIG. 22 are displayed as a virtual image.

Thereafter, angle data θy and θp, which are respective angle data in the yaw and pitch directions of the head and which are calculated based on the output from the angular velocity sensors 94 and 95, are reset (step S28). The adjustment process of the position of display screen is then completed.

This adjustment process determines the positions of the display frame 132 and the display screen 133 in the initial state. Thereafter, the angle data θy and θp are measured based on these positions in the initial state.

In the examples shown in FIGS. 21 and 22, the display frame 132 is explicitly shown by a borderline. However, the display frame 132 need not be explicitly shown.

In this embodiment, the process shown in FIG. 20 achieves the adjustment of the initial position. However, the present invention is not limited thereto. For example, when the head is tilted at a predetermined angle (for example, the observer tilts his or her head at an angle which the observer wants to set as an initial position), the observer may set the display screen to a predetermined position and may reset the angle data θy and θp by carrying out a predetermined key input operation (for example, by pressing the determination switch 55 or by clicking the left button 47). This operational design facilitates the adjustment of the initial positions of the display frame 132 and the display screen 133.

Figure 23:
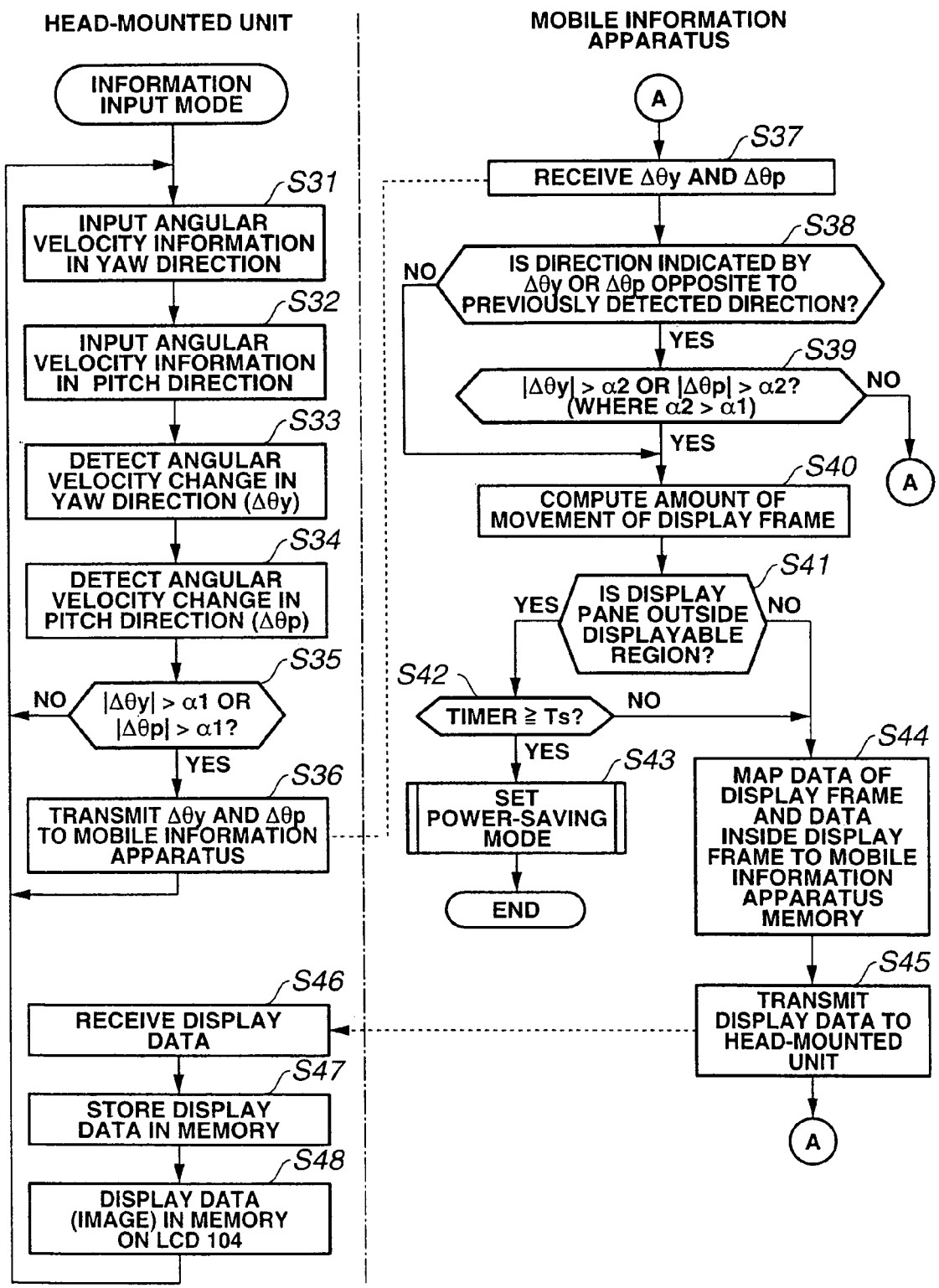
FIG. 23 is a flow chart illustrating processing for controlling the display position of an image when the mobile information system is used in an information input mode according to the first embodiment.

FIG. 23 is a flow chart of a process for controlling the display position of an image when the mobile information system 1 is used in the information input mode. As stated above, the information input mode is an operation mode when the mobile information system 1 is used as an information input device (see FIG. 10).

The process shown in FIG. 23 provides an observer with sensation as if the observer views an externally installed monitor by shifting the display region of the screen in the direction opposite to the head tilt direction.

When shifting the display region of the monitor in accordance with the head tilt angle, if the change in the display region rapidly and smoothly follows the change in the tilt angle of the head, no problem occurs. However, in practice, the update speed of display region is limited. Therefore, the display region is not always updated in a smooth way. In this embodiment, the display region is updated only when a change in the angle greater than or equal to a predetermined angle, which does not cause a significant loss of smoothness, occurs.

However, even if this process is employed, the display region is updated with some delay every time the tilt angle of the head slightly changes. In particular, if the display region is frequently updated, the observer feels uncomfortable. To solve this problem, in this embodiment, the threshold of the change in the head tilt angle when the head tilt changes in the forward direction is changed from that immediately after the head tilt changes in the backward direction. That is, by employing a characteristic known as a hysteresis characteristic in which the angle change causing the update of the display region immediately after detecting an angle change in the backward direction is greater than that in the forward direction, the uncomfortableness which the observer feels is reduced (see steps S35 through S40, and S44, which are described below).

Additionally, to further reduce the size and weight of the head-mounted unit 2, the computational operation in the head-mounted unit 2 is reduced.

That is, the head-mounted unit 2 primarily includes a function to receive predetermined display information from the mobile information apparatus 3 and display it on the see-through information display portion 108, a function to receive an audio signal from the mobile information apparatus 3 and play it back, and a function to detect an angular velocity of the head, detect the change amount of a tilt angle of the head during a predetermined time period, and transmit the result to the mobile information apparatus 3.

On the other hand, the mobile information apparatus 3 primarily includes a function to read information out of a recording medium (e.g., the recording memory 83 and the hard disk 85) storing the information including audio signals, images, and characters; a function to process display information among various types of the information read out of the recording medium, create display data that provides an observer with sensation as if the observer views an externally installed monitor, and transmit the display data to the head-mounted unit 2; and a function to play back the audio signals and images recorded in the recording medium by the mobile information apparatus 3 itself.

These operations are described in detail with reference to FIG. 23. In FIG. 23, the operation of the mobile information apparatus 3 is shown on the right side and the operation of the head-mounted unit 2 is shown on the left side.

First, the angular velocity information of the observer's head in the yaw direction detected by the angular velocity sensor 94 is inputted (step S31). Also, the angular velocity information of the observer's head in the pitch direction detected by the angular velocity sensor 95 is inputted (step S32).

Then, the angular velocity in the yaw direction obtained at step S31 is time-integrated to compute an angle change $\Delta\theta y$ [rad] in the yaw direction (step S33). Also, the angular velocity in the pitch direction obtained at step S32 is time-integrated to compute an angle change $\Delta\theta p$ [rad] in the pitch direction (step S34).

In the example shown in FIG. 23, the head-mounted unit 2 computes the angle changes $\Delta\theta y$ and $\Delta\theta p$. The head-mounted unit 2 then transmits the computed angle changes $\Delta\theta y$ and $\Delta\theta p$ to the mobile information apparatus 3 (see step S36 described below). However, the present invention is not limited thereto. The angle velocity information obtained from the angular velocity sensors 94 and 95 may be directly transferred to the mobile information apparatus 3, which computes angle changes $\Delta\theta y$ and $\Delta\theta p$ based on the received angle velocity information. In this case, the processing load of the head-mounted unit 2 can be further reduced.

Thereafter, it is determined whether at least one of an absolute value $|\Delta\theta y|$ of the angle change in the yaw direction and an absolute value $|\Delta\theta p|$ of the angle change in the pitch direction is greater than a predetermined value (a predetermined first threshold value) $\alpha 1$, that is, whether at least one of $|\Delta\theta y|>\alpha 1$ and $|\Delta\theta p|>\alpha 1$ is true (step S35).

If it is determined that at least one of $|\Delta\theta y|$ and $|\Delta\theta p|$ is greater than the predetermined value $\alpha 1$, the head-mounted unit 2 transmits data $\Delta\theta y$ and $\Delta\theta p$ to the mobile information apparatus 3 (step S36).

After the head-mounted unit 2 completes the operation at step S36, the process returns to step S31, where the head-mounted unit 2 repeats the above-described operation.

On the other hand, the mobile information apparatus 3 receives the data $\Delta\theta y$ and $\Delta\theta p$ transmitted, at step S36, from the head-mounted unit 2 (step S37).

It is then determined whether the received angle change $\Delta\theta y$ or $\Delta\theta p$ is a value in the direction opposite to the previously detected value, namely, a value having a sign opposite to that of the previously detected value (step S38). In this process, it is determined whether the change in the head tilt angle continues in the forward direction or changed to the backward direction.

At step S38, if the angle change is a value in the backward direction, it is further determined whether at least one of the absolute value $|\Delta\theta y|$ of the angle change in the yaw direction and the absolute value $|\Delta\theta p|$ of the angle change in the pitch direction is greater than a second predetermined value (a predetermined second threshold value) $\alpha 2$ (where $\alpha 2>\alpha 1$), that is, whether at least one of $|\Delta\theta y|>\alpha 2$ and $|\Delta\theta p|>\alpha 2$ is true (step S39).

At step S39, if it is determined that both $|\Delta\theta y|$ and $|\Delta\theta p|$ are smaller than or equal to the second predetermined value $\alpha 2$, the process returns to step S37, where the above-described operation is repeated.

In contrast, if, at step S39, it is determined that at least one of $|\Delta\theta y|$ and $|\Delta\theta p|$ is greater than the second predetermined value $\alpha 2$ or if, at step S38, the angle change is not a value in the backward direction (i.e., if the head tilt angle changes in the forward direction), the amount of movement of the display frame 132 (and the display screen 133) corresponding to $\Delta\theta y$ or $\Delta\theta p$ is computed (step S40). The amount of movement is computed by computing $L\times\Delta\theta y$ or $L\times\Delta\theta p$, where L is a distance from the eye of the observer to the screen.

Subsequently, based on the computed amount of movement, it is determined whether at least part of the display frame 132 (and the display screen 133) after the movement is positioned within the displayable region 131 or the whole display frame 132 is positioned outside the displayable region 131 (step S41).

If it is determined that the whole display frame 132 is positioned outside the displayable region 131, it is then determined whether the time period measured by the built-in timer of the second CPU 71 from the time when the whole display frame 132 is first positioned outside the displayable region 131 exceeds a predetermined time period $T_s$ pre-stored in the mobile information apparatus memory 78 (step S42).

The predetermined time period $T_s$ can be set to a desired value by, as stated above, operating the menu button 53 shown in FIG. 11, the menu selection switches 56, 57, 58, or 59, and the determination switch 55.

If, at step S42, it is determined that the predetermined time period $T_s$ has elapsed, the power supply circuit 75 of the mobile information apparatus 3 enters a power-saving mode to reduce electric power supplied from the power supply circuit 75 and a signal indicating the power-saving mode is transmitted to the head-mounted unit 2 (step S43).

Subsequently, the first CPU 91 of the head-mounted unit 2 analyzes the received signal indicating the power-saving mode and sets the power supply circuit 92 to a power-saving mode.

More specifically, the power-saving mode is achieved by stopping the operations of the first CPU 91 and the second CPU 71 excluding some operations or by stopping the operations of functional blocks other than the CPUs. This is done by well-known means.

If, at step S41, it is determined that at least part of the display frame 132 is positioned within the displayable region 131 and the image is displayable or if, at step S42, the time period in which the display frame 132 is undisplayable is shorter than the predetermined time period $T_s$, information about the display frame 132 and the display screen 133 is stored in the mobile information apparatus memory 78 by bit-mapping so that the display screen is moved in the direction opposite to the angle change in the observer's head in the yaw direction or in the pitch direction by a distance corresponding to the amount of movement computed at step S40 (step S44).

The data stored in each address of the mobile information apparatus memory 78 has a one-to-one correspondence with a display position (each pixel position) on the LCD 104 of the head-mounted unit 2.

The display data mapped to each address of the mobile information apparatus memory 78 is then transmitted to the head-mounted unit 2 (step S45).

After completing the process at step S45, the process returns to step S37, where the mobile information apparatus 3 repeats the above-described processing.

On the other hand, the head-mounted unit 2 receives the display data transmitted from the mobile information apparatus 3 (step S46) and stores the received display data in the memory 113 (step S47).

The data stored at each address of the memory 113 has a one-to-one correspondence with the data stored at each address of the mobile information apparatus memory 78. Consequently, the data stored at each address of the memory 113 has a one-to-one correspondence with each pixel of the LCD 104. Thus, by mapping the display data to each address of the mobile information apparatus memory 78 of the mobile information apparatus 3 or the memory 113 of the head-mounted unit 2 (i.e., by storing two-dimensional data), any information can be displayed on the LCD 104.

The head-mounted unit 2 then displays the display data stored in the memory 113 on the LCD 104 (step S48).

After completing the process at step S48, the process returns to step S31, where the head-mounted unit 2 repeats the above-described processing.

Figure 24:
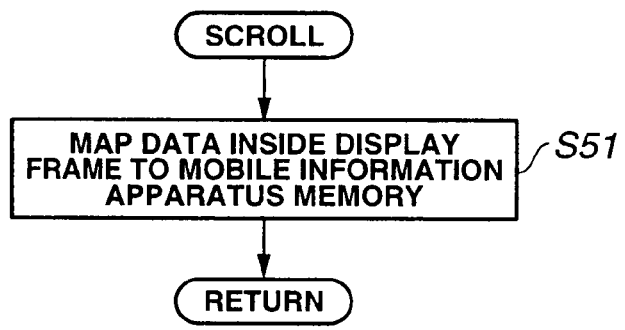
FIG. 24 is a flow chart illustrating a scroll process, which is carried out as an interrupt process according to the first embodiment.

FIG. 24 is a flow chart of a scroll process, which is carried out as an interrupt process.

In this mobile information system 1, an image displayed inside the display frame 132 can be scrolled. When the scroll operation is carried out, an interrupt occurs to execute the scroll process.

That is, after the scroll process starts, data in the mobile information apparatus memory 78 is mapped so that data, such as characters and images, in the display frame 132 are shifted in a predetermined direction in accordance with the operated scroll direction and scroll amount (step S51). Then, processing returns to the original process from this interrupt process.

This scroll operation is carried out by operating a predetermined key arranged on the keyboard 45 of the mobile information apparatus 3 (see FIG. 10). While pressing the key, a scroll operation is carried out in the specified direction. When a scroll operation is carried out, a display region is updated so that an image in the display region is scrolled.

Figure 25:
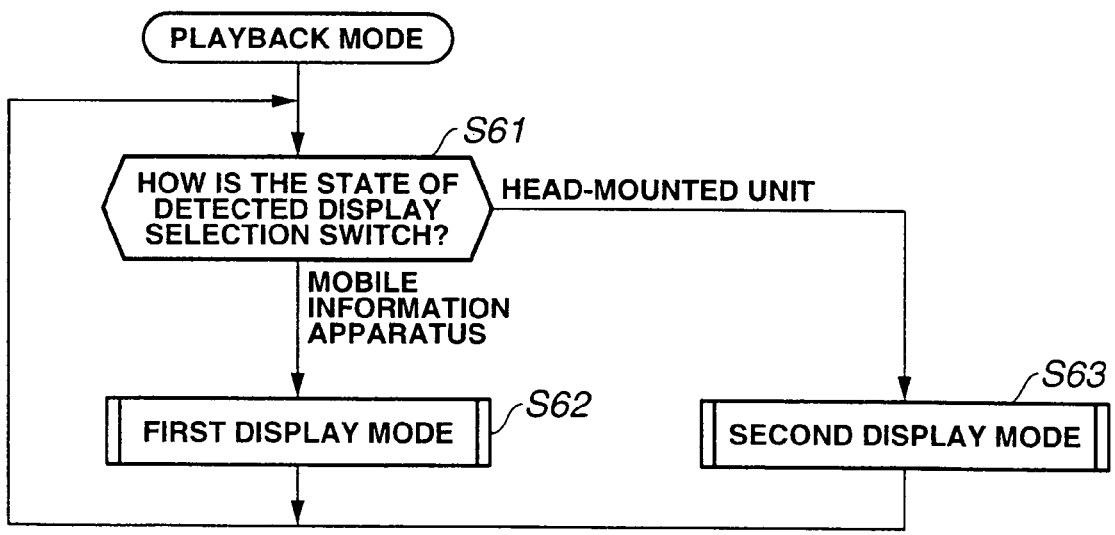
FIG. 25 is a flow chart illustrating a display control process when the mobile information system operates as a playback device according to the first embodiment.

FIG. 25 is a flow chart illustrating a display control process when the mobile information system 1 operates as a playback device. In a playback mode, the mobile information apparatus 3 of the mobile information system 1 is in a configuration shown in, for example, FIG. 11.

After the process in a playback mode starts, the state of the display selection switch 64 shown in FIG. 11 is first detected (step S61).

If "BDY" (here "BDY" indicates the mobile information apparatus 3 (body)) is selected by using the display selection switch 64, that is, if it is selected that information is played back on the LCD 51 of the mobile information apparatus 3, a process in the first display mode is carried out (step S62). The first display mode is the same as a display control of a regular playback device. The first display mode allows information recorded in the recording memory 83 or the hard disk 85 to be read out to temporarily store the information in the mobile information apparatus memory 78, and allows the information stored in the mobile information apparatus memory 78 to be converted into analog data by the D/A circuit 79 to display the analog data on the LCD 51.

If, at step S61, "HD" (here "HD" indicates the head-mounted unit 2 (head-mounted display)) is selected by using the display selection switch 64, that is, if it is selected that information is played back on the LCD 104 of the head-mounted unit 2, a process in the second display mode is carried out (step S63). The second display mode allows data read out of the recording memory 83 or the hard disk 85 to be temporarily stored in the mobile information apparatus memory 78, and allows the data to be transmitted to the head-mounted unit 2 to display the data on the LCD 104 of the head-mounted unit 2.

The difference between the second display mode in the playback mode shown in FIG. 25 and the information input mode shown in FIG. 23 is described next. (Here, the first display mode in the playback mode shown in FIG. 25 is a mode to display information on the LCD 51 of the mobile information apparatus 3. Since the LCD 51 is not used in the information input mode shown in FIG. 10, the difference between the first display mode shown in FIG. 10 and the first display mode shown in FIG. 23 is not described.) In the information input mode, information is input by operating the first operation switch 72 and the input information is displayed. On the other hand, in the second display mode, information stored in the recording memory 83 or the hard disk 85 is displayed. Thus, the second display mode differs from the information input mode in that only input sources of information are different. The other operations, for example, the operation which controls the display frame 132 in accordance with the tilt of the head so that information is played back and displayed as if the observer views an externally installed monitor, are identical to those shown in FIG. 23.

In the foregoing descriptions, when the mobile information system 1 is used as a playback device, the recording memory 83 or the hard disk 85 is used as an input source. However, the present invention is not limited thereto. For example, information may be input from an external information source via communication means and may be played back. More specifically, the mobile information system 1 may be connected to the Internet via a network interface. Information may be input via the Internet and may be displayed. In this case, the mobile information system 1 can be used as an Internet terminal.

According to the first embodiment, since a plurality of bodies of equipment are disposed as layers and the adjacent bodies of equipment are foldable and unfoldable about hinges, the mobile information apparatus can be compact. Here, since a plurality of the hinges are disposed perpendicular to each other, the hinges do not vertically overlap. Accordingly, the apparatus can be compact without detracting from the appearance of the apparatus. Furthermore, when the bodies of equipment are unfolded about the hinges, an operation member is arranged so that a user can operate the apparatus depending on each operation mode. This facilitates the operation of the mobile information apparatus. Still furthermore, a foldable and unfoldable body of equipment having a layer structure can increase the ratio of the surface area with respect to the volume of the mobile information apparatus, thereby increasing the area for arranging switches and an LCD. This allows the mobile information apparatus to be multifunctional. In addition, in the structure according to the first embodiment, information input or selected by the first operation switch in the first operation mode can be externally output. Consequently, at least one of an image and sound can be played back in the second operation mode.

Additionally, an image is shifted in the direction opposite to the tilt direction of an observer's head so that the position of a virtual image remains constant regardless of the tilt of the observer's head from the viewpoint of the observer. Consequently, the observer can view the image as if the observer sees an externally installed display screen, for example, a large display screen.

Furthermore, since the initial position of a displayed image can be adjusted, the observer can select the optimum initial position in accordance with differences among individuals and the intended use. Accordingly, for example, when the mobile information system 1 is used as a monitor for a personal computer in a train, the display screen is set to be located at an oblique downward position so that an observer can input characters via a keyboard of the mobile information apparatus. Also, since the head tilt angle is detected based on the initial position, the observer can view an image centered around the position of the head in a natural posture. This adjustment of the initial position of a display screen can conveniently provide a sensation as if the observer places an externally installed display screen at an optimum position.

Even when the head tilt angle changes, the display screen is not shifted in the direction opposite to the change in the head tilt angle if the amount of change in the head tilt angle during a predetermined time period is smaller than or equal to a first threshold value. Accordingly, computation is not required every time the head position slightly changes, and therefore, the load on the CPU can be reduced.

Still furthermore, when the head tilt angle changes in the opposite direction, a threshold value (a second threshold value) for determining whether the display screen is to be shifted in the direction opposite to the head tilt angle change is made larger than a threshold value for determining whether the display screen is to be shifted when the head tilt angle changes in same direction. This design can effectively prevent a flicker of a screen due to slight vibration of the head centered around a predetermined position.

Also, display information in the display region can be scrolled from side to side and up and down. Accordingly, the desired information can be displayed at an easily viewable position. Thus, a small and lightweight apparatus that displays information an observer can comfortably see can be provided.

In addition, the head-mounted unit primarily displays information and detects angular velocity information, whereas the mobile information apparatus carries out other complicated arithmetic operations and a recording operation of the information. Accordingly, the processing load on the head-mounted unit can be reduced. This design can reduce power consumption of the head-mounted unit. For example, the size of a battery serving as a power supply can be reduced, thereby in turn reducing the size and weight of the head-mounted unit. As a result, the head-mounted unit can be comfortably used.

In particular, the head-mounted unit communicates with the mobile information apparatus by radio. Accordingly, the movement of the head-mounted unit is not restricted by electrical cords. An observer can view predetermined information while freely carrying out actions as usual.

When a display frame is positioned outside a displayable region and is not displayed for more than a predetermined time period, the mobile information system automatically enters a power-saving mode. Accordingly, the power consumption can be reduced without carrying out an intentional power-off operation. Thus, the battery life can be prolonged. For example, as stated above, when the mobile information system is used as a monitor for a personal computer in a train and the display screen is set to be located at an oblique downward position, raising the head to get off the train removes the screen from the observer's vision, and therefore, the observer can see the external world without any obstacles. The observer can safely act as normal without removing the display unit, and the power consumption of the display unit can be reduced without powering off the display unit.

Since an LCD is also provided to the mobile information apparatus, an observer can view displayed information even when the observer removes the head-mounted unit from his or her head. In this case, the observer can select one of the head-mounted unit and the mobile information apparatus to display the information, and thus, the information is not displayed on the unobserved one. As a result, electric power can be prevented from being wasted.

The head-mounted unit in a usable state normally implies that an observer intends to view information by using the head-mounted unit. Therefore, when the head-mounted unit is in a usable state, information is preferentially displayed on the head-mounted unit. This design automates the operation and improves the operability.

By simply powering on and off the mobile information apparatus, the head-mounted unit can be controlled to power on and off at the same time. Accordingly, for a mobile information system that sometimes requires concurrent use of the mobile information apparatus and the head-mounted unit, the operation is conveniently easy to use.

If the head-mounted unit sends no reply, the mobile information apparatus is powered off or enters a standby state. Accordingly, even when the power switch of the mobile information apparatus is accidentally turned on, electric power can be prevented from being wasted or the power consumption can be reduced. For example, when the mobile information system is carried around in a bag, there is really very little possibility of accidentally powering on the mobile information apparatus and the head-mounted unit, which have separate bodies, at the same time. Thus, this is means for reliably reducing wasteful power consumption.

The above-described power control is especially effective for the mobile information system that requires the smallness, the lightweightness, and a long battery life.

Thus, the value of the wearable mobile information system that provides advanced features with easy-to-use operations can be increased.

Second Embodiment

Figure 27:
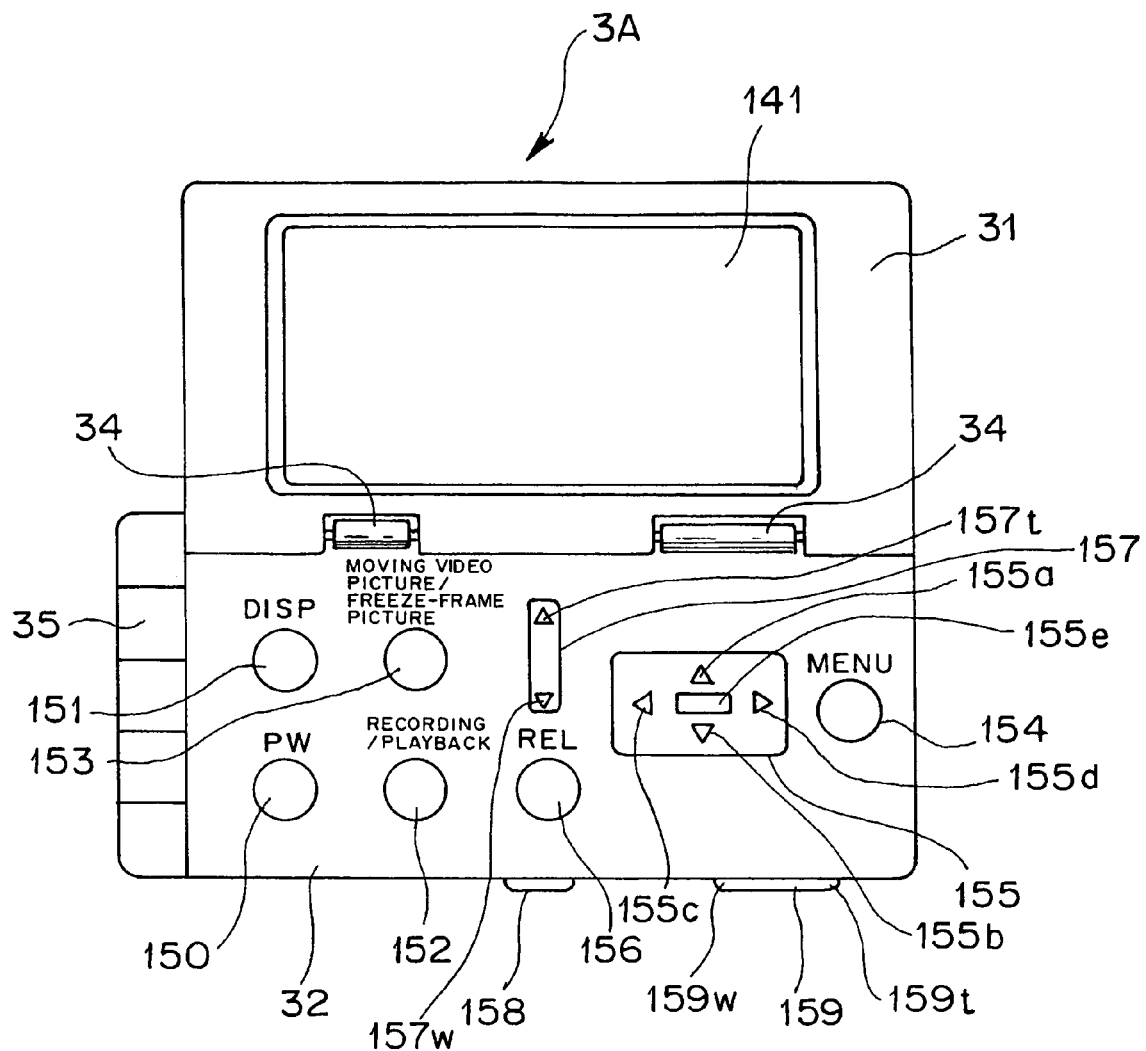
FIG. 27 is a plan view illustrating the mobile information apparatus when only an upper body of equipment is unfolded according to the second embodiment.

FIGS. 26 and 27 illustrate a second embodiment of the present invention, where FIG. 26 is a block diagram of a mobile information apparatus capable of communicating with a head-mounted unit and FIG. 27 is a plan view of the mobile information apparatus when only an upper body of equipment is unfolded.

In the second embodiment, identical elements to those illustrated and described in relation to the first embodiment are designated by identical reference numerals, and therefore, descriptions are not repeated. Only the different configurations are described.

A mobile information system according to this embodiment has a first operation mode that allows at least one of an image and sound to be input and a second operation mode that allows at least one of an image and sound to be played back. When the upper body of equipment 31 is unfolded from the middle body of equipment 32, the operation is carried out in the first operation mode. When the middle body of equipment 32 is unfolded from the lower body of equipment 33, the operation is carried out in the second operation mode. As in the first embodiment, a mobile information apparatus 3A is composed of three stacked layers of the upper body of equipment 31, the middle body of equipment 32, and the lower body of equipment 33.

As shown in FIG. 26, the mobile information system includes a head-mounted unit 2A and the mobile information apparatus 3A connected to the head-mounted unit. 2A by, for example, radio.

Unlike the head-mounted unit 2 in the first embodiment, the head-mounted unit 2A has a function to capture an image and a function to display various types of information required for capturing the image while superimposing the information on the external world.

The mobile information apparatus 3A includes a second CPU 71A, a first operation switch 72A, an LCD 141, a recording and playback unit 142, the LCD 51, the speaker 52, and the second operation switch 73.

The first operation switch 72A is used for controlling the image capturing operation by the head-mounted unit 2A in the first operation mode. As shown in FIG. 27, the first operation switch 72A is provided to at least one of the upper body of equipment 31 and the middle body of equipment 32.

The second CPU 71A, which is a control unit and control means, transmits operational information input via the operation of the first operation switch 72 to the head-mounted unit 2A. Also, the second CPU 71A receives image data and audio data captured by the head-mounted unit 2A and delivers these image data and audio data to the recording and playback unit 142.

The LCD 141 is a liquid crystal monitor for displaying a variety of information when photographing conditions are set. As shown in FIG. 27, the LCD 141 is provided to at least one of the upper body of equipment 31 and the middle body of equipment 32 (in this example, the upper body of equipment 31).

The recording and playback unit 142 records the received image data and audio data and plays back the recorded image data and audio data. The recording and playback unit 142 includes a recording medium and a compression/decompression circuit (none are shown).

The LCD 51, as stated above, plays back image data recorded in the recording and playback unit 142 to display the image data.

The speaker 52, as stated above, plays back audio data recorded in the recording and playback unit 142 to output the audio data as sound.

Also, the second operation switch 73, as stated above, controls the playback operation of the recording and playback unit 142. By operating the second operation switch 73, play-ing back image data on the LCD 51, playing back audio data from the speaker 52, and input for editing image data and audio data can be carried out.

The appearance of the mobile information apparatus 3A is described next with reference to FIG. 27. FIG. 27 illustrates the appearance when the upper body of equipment 31 is unfolded from the middle body of equipment 32. The appearance of the mobile information apparatus 3A when the middle body of equipment 32 is unfolded from the lower body of equipment 33 is the same as that shown in FIG. 11 of the first embodiment. The switches arranged as shown in FIG. 11 function as the second operation switch 73. The configuration and functionality of the second operation switch 73 are the same as those in the first embodiment.

As shown in FIG. 27, when the upper body of equipment 31 is unfolded from the middle body of equipment 32 about the hinge 34, the first operation switch 72A is exposed so that the first operation switch 72 is operated in the first operation mode, as stated above.

As can be seen from the drawing, the LCD 141 is mounted on the upper body of equipment 31 to display various types of information in the first operation mode.

On the middle body of equipment 32, a variety of operation switches 150 to 159 included in the first operation switch 72A are arranged.

A power switch 150 is used for starting to supply electric power to the first operation switch 72A, the second CPU 71A, and the LCD 141 shown in FIG. 26. However, components supplied with electric power in conjunction with the ON-operation of the power switch 150 are not limited thereto. For example, the power switch 150 may start supplying electric power to the head-mounted unit 2A. Electrical power is turned on and off every time the power switch 150 is pressed.

A display switch 151 is used to select whether a variety of mode information is displayed on the LCD 141, on the head-mounted unit 2A, on none of them, or on both of them. The display switch 151 rotationally selects one of these four display modes every time the display switch 151 is pressed.

A recording/playback switch 152 is used for selecting one of a recording mode, which captures the image of a subject and records the image, and a playback mode, which plays back the recorded image.

A moving/still picture switch 153 is used for selecting one of capturing a moving image and a still image.

A menu switch 154 is used for selecting whether or not a menu is displayed on the LCD 141. Every time the menu switch 154 is pressed, the menu appears or disappears on the LCD 141.

The items of the menu displayed on the LCD 141 differ depending on whether the recording/playback switch 152 selects the recording mode or the playback mode. For example, when the recording mode is selected, items, such as a photographing mode (e.g., an auto mode, a manual mode, and a program mode), an image size, an image quality, and color balance, are displayed. Various values can be set for each item. On the other hand, when the playback mode is selected, items, such as an output of beep, brightness of a liquid crystal display (LCD), input of date and time, initialization of a recording medium, language selection, a video output format (NTSC or PAL), and erase of an image data, are displayed. Various values can be set to each item.

A switch 155 is used for selecting one of the above-described menu items displayed on the LCD 141 to set the item. That is, the switch 155 serves as a switch known as a four-way key. The switch 155 includes an upper key 155a, a lower key 155b, a left key 155c, and a right key 155d. The switch 155 further includes a setting key 155e at the center of the four keys. By pressing the upper, lower, left, or right keys 155a, 155b, 155c, and 155d, a desired item and a value for the item displayed on the LCD 141 are selected. By pressing the setting key 155e, the selected value for the selected item is determined.

A release switch 156 is a push switch used to start photographing a picture by a camera mounted on the head-mounted unit 2. By pressing the release switch 156, information instructing photographing is transmitted from the second CPU 71A to the head-mounted unit 2A via, for example, wireless communication. Upon receiving the photographing instruction, the head-mounted unit 2A captures image data and audio data, which are then transmitted to the second CPU 71A via wireless communication. The second CPU 71A records the received image data and audio data in a recording medium mounted in the recording and playback unit 142 via the recording and playback unit 142.

A zoom switch 157 is used for changing a focal length of a lens (in this example, a zoom lens) of the camera mounted on the head-mounted unit 2A. The zoom switch 157 includes a tele switch 157t and a wide switch 157w for changing the focal length to a telescope mode and to a wide-angle mode, respectively. By operating the zoom switch 157, an instruction to change a focal length of the lens to the telescope mode or to the wide-angle mode is transmitted from the second CPU 71A to the head-mounted unit 2A via, for example, wireless communication. The head-mounted unit 2A changes a focal length of the lens in response to the received instruction.

Additionally, a release switch 158 having the same function as the release switch 156 is provided on the side surface of the middle body of equipment 32.

Furthermore, a zoom switch 159 having the same function as the zoom switch 157 is provided on the side surface of the middle body of equipment 32. Like the above-described zoom switch 157, the zoom switch 159 includes a tele switch 159t and a wide switch 159w for changing a focal length of the lens of the camera mounted on the head-mounted unit 2 to a telescope mode and to a wide-angle mode, respectively.

Since the release switch 158 and the zoom switch 159 are mounted on the side surface of the middle body of equipment 32, a release operation and a zoom operation can be carried out even when all of the upper body of equipment 31, the middle body of equipment 32, and the lower body of equipment 33 are folded. In addition, these operations can be easily carried out by using even one hand during the photographing operation.

Thus, in the mobile information system according to the second embodiment, when the upper body of equipment 31 is unfolded from the middle body of equipment 32 about the hinge 34, images and sound captured by the head-mounted unit 2A when operating the first operation switch 72A are transmitted to the mobile information apparatus 3A, which then records the received images and sound. When the middle body of equipment 32 is unfolded from the lower body of equipment 33 about the hinge 35, the images and sound are played back by operating the second operation switch 73.

In the foregoing description, an example of a device for inputting an image and sound is the head-mounted unit 2A. However, a camera is not limited to the camera mounted on a head-mounted unit. Any other types of cameras that allow remote control may be employed. Alternatively, the mobile information apparatus may include a function to input an image and sound by itself.

According to the second embodiment, substantially the same advantage as the first embodiment is provided. In addition, at least one of an image and sound can be input in the first operation mode, and at least one of an image and sound can be played back in the second operation mode.

Third Embodiment

Figure 29:
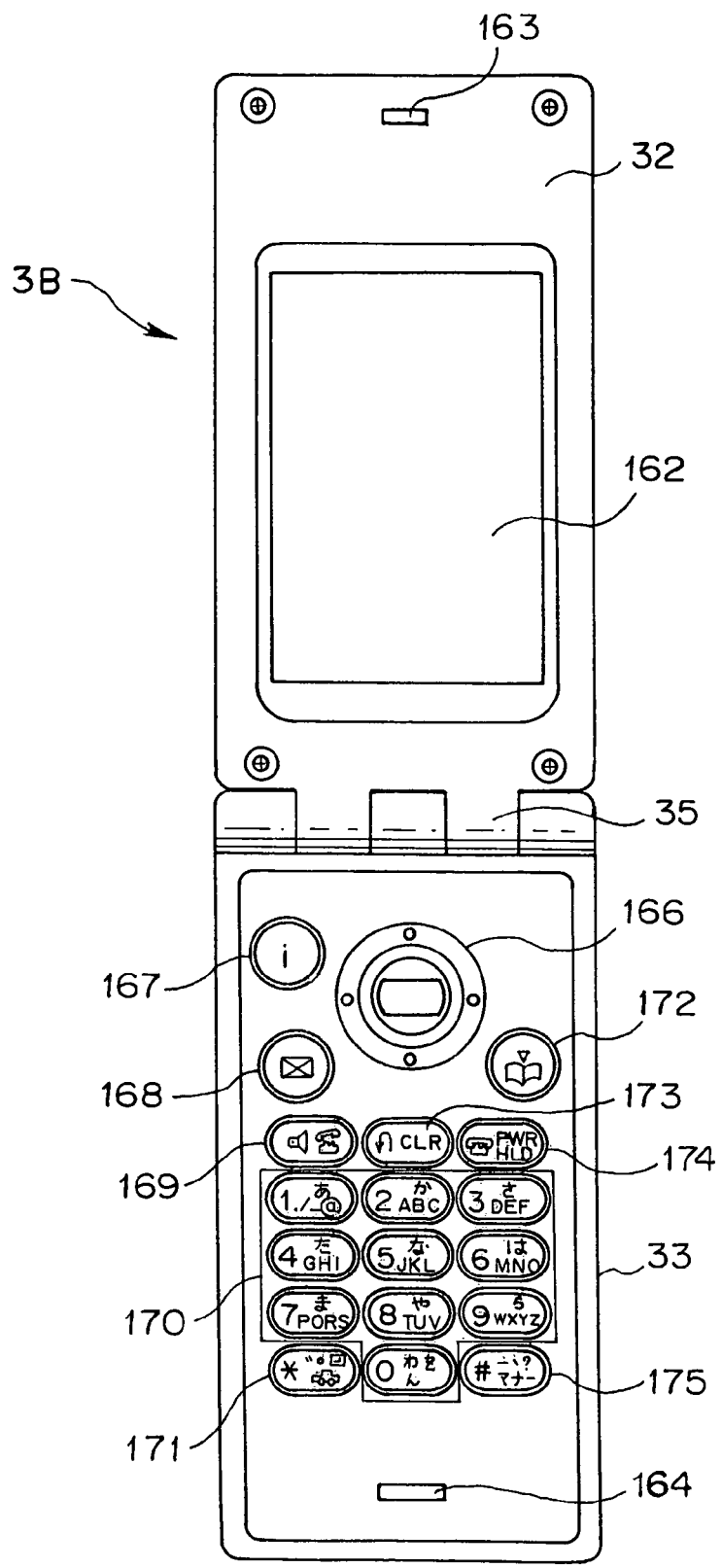
FIG. 29 is a plan view illustrating the mobile information apparatus when an upper body of equipment is folded and a middle body of equipment is unfolded according to the third embodiment.

FIGS. 28 and 29 illustrate a third embodiment of the present invention, where FIG. 28 is a block diagram of a mobile information apparatus capable of communicating with a head-mounted unit and FIG. 29 is a plan view of the mobile information apparatus when the upper body of equipment is folded and the middle body of equipment is unfolded.

In the third embodiment, identical elements to those illustrated and described in relation to the first and second embodiments are designated by identical reference numerals, and therefore, descriptions are not repeated. Only the different configurations are described.

A mobile information system according to this embodiment has a first operation mode that transmits display information to an externally installed display unit and a second operation mode that transmits and receives information to and from an external unit. As in the above-described embodiments, when both upper body of equipment 31 and middle body of equipment 32 are unfolded, the operation is carried out in the first operation mode. When both middle body of equipment 32 and lower body of equipment 33 are unfolded, the operation is carried out in the second operation mode. In addition, as in the first and second embodiments, a mobile information apparatus 3B is composed of three stacked layers of the upper body of equipment 31, the middle body of equipment 32, and the lower body of equipment 33.

As shown in FIG. 28, the mobile information system also includes a head-mounted unit 2 and the mobile information apparatus 3B connected to the head-mounted unit 2 by, for example, radio.

The head-mounted unit 2 is an externally installed display unit. Like the first embodiment, the head-mounted unit 2 has a function to display predetermined information based on information input by operating the first operation switch 72.

The mobile information apparatus 3B includes a second CPU 71B, the first operation switch 72, a communication control unit 161, an LCD 162, a speaker 163, a microphone 164, and a second operation switch 73B.

The first operation switch 72 is identical to that shown in FIG. 10 of the first embodiment. That is, the first operation switch 72 is used for inputting a variety of information in the first operation mode. As stated above, the first operation switch 72 is provided to at least one of the upper body of equipment 31 and the middle body of equipment 32.

The second CPU 71B, which is a control unit and control means, processes information input via the operation of the first operation switch 72 to convert the information into display data, and then transmits the display data to the head-mounted unit 2 via, for example, radio.

The communication control unit 161 has a function identical to a regular cell phone having an Internet connection function, and therefore, the communication control unit 161 can externally transmit information and can externally receive various types of information.

The LCD 162 is used for displaying various types of information when the communication control unit 161 operates as a cell phone. The LCD 162 also is used for displaying externally received image and character information.

The speaker 163 plays back audio data externally received by the communication control unit 161 and outputs the audio data as sound.

The microphone 164 is used for inputting sound when the communication control unit 161 operates as a cell phone. Audio data input by the microphone 164 is externally transmitted via the communication control unit 161.

The second operation switch 73B, as described below, is substantially the same as a group of operation switches mounted on a cell phone. Information (e.g., character information) input by the second operation switch 73B is also externally transmitted via the communication control unit 161 in the form of, for example, e-mail.

The appearance of the mobile information apparatus 3B is described next with reference to FIG. 29. FIG. 29 illustrates the appearance of the mobile information apparatus 3B when the middle body of equipment 32 is unfolded from the lower body of equipment 33. The appearance of the mobile information apparatus 3B when the upper body of equipment 31 is unfolded from the middle body of equipment 32 is the same as that shown in FIG. 10 of the first embodiment. The switches arranged as shown in FIG. 10 function as the first operation switch 72. The configuration and operation of the first operation switch 72 are the same as those in the first embodiment.

As shown in FIG. 29, when the middle body of equipment 32 is unfolded from the lower body of equipment 33 about the hinge 35, the second operation switch 73B is exposed, as stated above, and operation in the second operation mode is performed.

As can be seen from the drawing, the LCD 162 is mounted on the middle body of equipment 32 to display various types of information in the second operation mode. Furthermore, the speaker 163, which serves as an earpiece, is provided on the section above the LCD 162.

The microphone 164, which serves as a mouthpiece, various types of operation switches 166 through 175 included in the second operation switch 73B are arranged on the lower body of equipment 33. The operation switches 166 through 175 are used when the mobile information apparatus 3B is used as a cell phone having an Internet connection function.

That is, the multi-guide switch 166 is pushed and operated to display or select a function menu, re-dialing, and a reception log, and to execute or set the operation.

The i-mode switch 167 is a push switch to use a mode for transmitting and receiving information via the Internet.

The mail switch 168 is a push switch to select a mode for using an e-mail function.

The start switch 169 is a push switch to select a mode for making and receiving a call.

The dial switch 170 is a push switch to input a telephone number or characters. In this embodiment, the dial switch 170 is composed of ten sub-switches.

The first symbol switch 171 is a push switch to input a symbol "*", a voiced sound symbol (for Japanese language), or a line feed.

The telephone-directory switch 172 is a push switch to search a telephone directory.

The clear switch 173 is a push switch to delete an inputted telephone number or a character.

The power switch 174 is a push switch to power on or off the mobile information apparatus 3B when using the mobile information apparatus 3B as a cell phone.

The second symbol switch 175 is a push switch to input a symbol, such as "#", "-", ",", or "?".

Thus, in the mobile information system according to this embodiment, when the upper body of equipment 31 is unfolded from the middle body of equipment 32 about the hinge 34, display information is transmitted from the mobile information apparatus 3B to the head-mounted unit 2 by operating the first operation switch 72, whereas, when the middle body of equipment 32 is unfolded from the lower body of equipment 33 about the hinge 35, the mobile information apparatus 3B can be used as a cell phone and information can be transmitted and received via the Internet (i.e., external transmission and reception of the information) by operating the second operation switch 73B.

In this embodiment, the head-mounted unit 2 having an information display function is used as a head-mounted unit working with the mobile information apparatus 3B. However, the present invention is not limited thereto. For example, the head-mounted unit 2A having a display function and an image capturing function, as shown in FIG. 26, may be used.

Furthermore, in the foregoing description, an example of an external display unit working with the mobile information apparatus 3B is the head-mounted unit 2 mounted on the head. However, a display unit is not limited thereto. Any other types of display units may be employed.

According to the third embodiment, substantially the same advantage as that of the first and second embodiments is provided. In addition, display information can be transmitted to an externally installed display unit in the first operation mode, and information can be externally transmitted and received in the second operation mode.

In the above-described embodiments, the body of equipment is composed of three layers. However, the present invention is not limited thereto. For example, the present invention can be applied to a body of equipment composed of four and more layers connected to each other via hinge units so as to be foldable and unfoldable.

Having described the preferred embodiments of the invention referring to the accompanying drawings, it should be understood that the present invention is not limited to those precise embodiments, and various changes and modifications thereof could be made by one skilled in the art without departing from the spirit or scope of the invention as defined in the appended claims.

What is claimed is:

1. A mobile information apparatus configured for operation in a first operation mode for inputting information for operating an external apparatus or information to be displayed on the external apparatus and a second operation mode for connection with the Internet to enable communication with an external information source, the mobile information apparatus comprising:
   a first element, a second element, and a third element arranged in stacked layers;
   a first hinge unit for connecting the first element to the second element in a pivotal manner so that the first element and the second element are capable of being placed in folded and unfolded positions;
   a second hinge unit for connecting the second element to the third element in a pivotal manner so that the second element and the third element are capable of being placed in folded and unfolded positions;
   a first operation member mounted on at least one of opposing surfaces of the first element and the second element, which surfaces are opposed to each other when the first and second elements are folded together, to input the information in the first operation mode when only the first element and the second element are in the unfolded positions; and
   a second operation member mounted on at least one of opposing surfaces of the second element-and the third element, which surfaces of the second and third elements are opposed to each other when the second and third elements are folded together, to communicate with the external information source when only the second element and the third element are in the unfolded positions.

2. The mobile information apparatus according to claim 1, wherein the axis direction of the first hinge unit is perpendicular to the axis direction of the second hinge unit.

* * * * *